United States Patent
Zhang et al.

(10) Patent No.: US 9,930,498 B2
(45) Date of Patent: Mar. 27, 2018

(54) TECHNIQUES FOR MULTIMEDIA BROADCAST MULTICAST SERVICE TRANSMISSIONS IN UNLICENSED SPECTRUM

(71) Applicant: QUALCOMM Incorporated, San Diego, CA (US)

(72) Inventors: Xiaoxia Zhang, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/222,745

(22) Filed: Jul. 28, 2016

(65) Prior Publication Data

US 2017/0034670 A1 Feb. 2, 2017

Related U.S. Application Data

(60) Provisional application No. 62/199,843, filed on Jul. 31, 2015.

(51) Int. Cl.
*H04J 11/00* (2006.01)
*G08C 15/00* (2006.01)
(Continued)

(52) U.S. Cl.
CPC ............ *H04W 4/06* (2013.01); *H04W 16/14* (2013.01); *H04W 74/006* (2013.01);
(Continued)

(58) Field of Classification Search
CPC ... H04W 88/14; H04W 72/0453; H04W 4/06; H04L 27/2647; H04L 27/26002;
(Continued)

(56) References Cited

U.S. PATENT DOCUMENTS 5,068,878 A * 11/1991 Lin .................. G11B 20/12
360/48
5,790,568 A * 8/1998 Luong ................. H03M 13/15
714/781

(Continued)

FOREIGN PATENT DOCUMENTS

WO WO-2013/074460 A1 5/2013

OTHER PUBLICATIONS

International Search Report and Written Opinion—PCT/US2016/044756—ISA/EPO—dated Nov. 2, 2016. (13 pages).

*Primary Examiner* — William D Cumming
(74) *Attorney, Agent, or Firm* — Arent Fox, LLP

(57) ABSTRACT

A method and apparatus for adjusting preamble transmissions to maintain synchronization with other network entities operating in an unlicensed spectrum during wireless communications are described. The method and apparatus include accessing, by a second node, a contention-based medium currently accessed by a first node transmitting a first burst of data. The method and apparatus further include transmitting, by the second node, a second burst of data over the accessed medium, the second burst of data having an associated preamble configured not to interfere with a joint transmission portion of the first burst of data. The first and second nodes may be enhanced-multimedia broadcast multicast service (eMBMS) nodes. Moreover, the joint transmission portion of the first burst of data may include transmission of one or more multicast-broadcast single-frequency network (MBSFN) subframes.

30 Claims, 20 Drawing Sheets

(51) Int. Cl.
*H04J 1/16* (2006.01)
*H04L 1/00* (2006.01)
*H04W 4/06* (2009.01)
*H04W 16/14* (2009.01)
*H04W 74/08* (2009.01)
*H04W 74/00* (2009.01)
*H04W 56/00* (2009.01)
*H04W 72/00* (2009.01)

(52) U.S. Cl.
CPC .......... *H04W 74/08* (2013.01); *H04W 56/001* (2013.01); *H04W 72/005* (2013.01)

(58) Field of Classification Search
CPC . H04L 25/0212; H04L 12/2801; H04L 5/001; H04L 47/28; H04L 12/413; H04L 7/2656
USPC ....... 370/203, 210, 241, 252, 255, 260, 278, 370/280, 311, 33 O, 336, 352, 373, 465, 370/503, 254, 312, 345
See application file for complete search history.

(56) References Cited

U.S. PATENT DOCUMENTS

| | | | | |
|---|---|---|---|---|
| 6,016,313 | A * | 1/2000 | Foster, Jr. | H04W 72/0486 370/330 |
| 6,028,933 | A * | 2/2000 | Heer | H04L 63/04 380/212 |
| 6,041,051 | A * | 3/2000 | Doshi | H04L 12/2801 370/352 |
| 6,055,242 | A * | 4/2000 | Doshi | H04J 3/1694 348/E7.07 |
| 6,597,668 | B1 * | 7/2003 | Schafer | H04J 3/1694 370/252 |
| 6,735,452 | B1 * | 5/2004 | Foster, Jr. | H04W 72/0486 370/330 |
| 6,748,240 | B1 * | 6/2004 | Foster, Jr. | H04W 72/0486 342/373 |
| 6,778,516 | B1 * | 8/2004 | Foster, Jr. | H04W 72/0486 370/336 |
| 6,795,426 | B1 * | 9/2004 | Raleigh | H04L 27/2647 370/210 |
| 6,909,723 | B1 * | 6/2005 | Yonge, III | H04L 47/10 370/447 |
| 7,000,031 | B2 * | 2/2006 | Fischer | H04L 1/0003 370/503 |
| 7,054,289 | B1 * | 5/2006 | Foster, Jr. | H04W 72/0486 370/330 |
| 7,483,444 | B2 * | 1/2009 | Raleigh | H04L 27/2647 370/278 |
| 7,813,261 | B2 * | 10/2010 | Ma | H04L 27/2602 370/203 |
| 7,859,990 | B2 * | 12/2010 | Mudulodu | H04L 25/0224 370/203 |
| 8,493,995 | B2 * | 7/2013 | Krishnam | H04L 47/826 370/461 |
| 8,593,992 | B2 * | 11/2013 | Azenkot | H04L 47/28 370/254 |
| 8,660,013 | B2 * | 2/2014 | Yonge, III | H04L 12/413 370/241 |
| 8,774,072 | B2 * | 7/2014 | Morris | H04B 7/2656 370/311 |
| 9,107,186 | B2 * | 8/2015 | Zhang | H04L 5/001 |
| 9,282,520 | B2 * | 3/2016 | Morris | H04B 7/2656 |
| 9,413,688 | B2 * | 8/2016 | Katar | H04L 47/826 |
| 9,552,206 | B2 * | 1/2017 | Johnson | G06F 9/30 |
| 9,642,140 | B2 * | 5/2017 | Ng | H04W 72/0453 |
| 2002/0027886 | A1 * | 3/2002 | Fischer | H04L 1/0003 370/255 |
| 2002/0163932 | A1 * | 11/2002 | Fischer | H04L 1/0003 370/465 |
| 2005/0163095 | A1 * | 7/2005 | Raleigh | H04L 27/2647 370/345 |
| 2007/0206510 | A1 * | 9/2007 | Morris | H04B 7/2656 370/252 |
| 2009/0028258 | A1 * | 1/2009 | Ma | H04L 27/2602 375/260 |
| 2011/0267956 | A1 * | 11/2011 | Yonge, III | H04L 12/413 370/241 |
| 2012/0051238 | A1 * | 3/2012 | Azenkot | H04L 47/28 370/252 |
| 2012/0131309 | A1 * | 5/2012 | Johnson | G06F 9/30 712/41 |
| 2012/0213130 | A1 * | 8/2012 | Zhang | H04L 5/001 370/280 |
| 2012/0213144 | A1 * | 8/2012 | Zhang | H04B 7/024 370/312 |
| 2014/0293972 | A1 * | 10/2014 | Morris | H04B 7/2656 370/336 |
| 2014/0369242 | A1 * | 12/2014 | Ng | H04W 72/0453 370/280 |
| 2015/0055541 | A1 | 2/2015 | Zhang et al. | |
| 2017/0034670 | A1 * | 2/2017 | Zhang | H04W 4/06 |

* cited by examiner

Resync boundary

Node 1: preamble | DL Unicast | MBSFN | MBSFN | MBSFN | DL Unicast | Special SF | UL Node 2: preamble | DL Unicast | MBSFN | MBSFN | MBSFN | DL Unicast | Special SF | UL

TECHNIQUES FOR MULTIMEDIA BROADCAST MULTICAST SERVICE TRANSMISSIONS IN UNLICENSED SPECTRUM

CROSS-REFERENCE TO RELATED APPLICATIONS

The present application for patent claims priority to U.S. Provisional Application No. 62/199,843 entitled "TECHNIQUES FOR MULTIMEDIA BROADCAST MULTICAST SERVICE TRANSMISSIONS IN UNLICENSED SPECTRUM" filed Jul. 31, 2015, which is assigned to the assignee hereof and hereby expressly incorporated by reference herein.

BACKGROUND

Aspects of this disclosure relate generally to telecommunications, and more particularly to techniques for multimedia broadcast multicast service transmissions in unlicensed spectrum.

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network entities. The network entities of wireless wide area network (WWAN), such as a cellular network, may include a number of base stations, such as NodeBs (NBs) or evolved NodeBs (eNBs). The network entities of a wireless local area network (WLAN) may include a number of WLAN network entities, such as Wi-Fi nodes. Each network entity may support communication for a number of user equipments (UEs) or wireless stations and may often communicate with multiple UEs at the same time. Similarly, each UE may communicate with a number of network entities, and may sometimes communicate with multiple network entities and/or network entities employing different access technologies. A network entity may communicate with a UE via downlink and uplink. The downlink (or forward link) refers to the communication link from the network entity to the UE, and the uplink (or reverse link) refers to the communication link from the UE to the network entity.

As cellular networks become more congested, operators are beginning to look at ways to increase capacity. One approach may include the use of WLANs to, for example, offload some of the traffic and/or signaling of a cellular network. WLANs (or Wi-Fi networks) are attractive because, unlike cellular networks that operate in a licensed spectrum, Wi-Fi networks generally operate in an unlicensed or shared spectrum (e.g., unlicensed spectrum). However, access to unlicensed spectrum may need coordination to ensure that network entities of the same or different operator deployments, using the same or different techniques for accessing the unlicensed spectrum, can co-exist and make effective use of the unlicensed spectrum.

Methods are needed to provide efficient and improved process for maintaining synchronization among a plurality of network entities engaged in joint transmissions on an unlicensed spectrum. In certain instances, if one of the network entities accesses the unlicensed spectrum after a resynchronization boundary and while one or more other nodes are already engaged in joint transmissions interference may occur. Thus, improvements in maintaining synchronization among network entities in unlicensed spectrum during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method for configuring preamble transmissions to maintain synchronization with other network entities operating in an unlicensed spectrum during wireless communications is provided. The described aspects include accessing, by a second node, an unlicensed spectrum currently accessed by a first node transmitting a first burst of data. The described aspects further include transmitting, by the second node, a second burst of data over the accessed medium, the second burst of data having an associated preamble configured not to interfere with a joint transmission portion of the first burst of data.

In another aspect, a present apparatus for configuring preamble transmissions to maintain synchronization with other network entities operating in an unlicensed spectrum during wireless communications may include memory configured to store instructions, and one or more processors communicatively coupled with the memory, wherein the one or more processors and the memory are configured to access, by a second node, an unlicensed spectrum currently accessed by a first node transmitting a first burst of data. The described aspects further transmit, by the second node, a second burst of data over the accessed medium, the second burst of data having an associated preamble configured not to interfere with a joint transmission portion of the first burst of data.

In another aspect, a present computer-readable medium may store computer executable code for configuring preamble transmissions to maintain synchronization with other network entities operating in an unlicensed spectrum during wireless communications. The described aspects include code for accessing, by a second node, an unlicensed spectrum currently accessed by a first node transmitting a first burst of data. The described aspects further include code for transmitting, by the second node, a second burst of data over the accessed medium, the second burst of data having an associated preamble configured not to interfere with a joint transmission portion of the first burst of data.

In another aspect, a present apparatus for configuring preamble transmissions to maintain synchronization with other network entities operating in an unlicensed spectrum during wireless communications may include means for accessing, by a second node, an unlicensed spectrum currently accessed by a first node transmitting a first burst of data. The described aspects further include means for transmitting, by the second node, a second burst of data over the accessed medium, the second burst of data having an associated preamble configured not to interfere with a joint transmission portion of the first burst of data.

Various aspects and features of the disclosure are described in further detail below with reference to various examples thereof as shown in the accompanying drawings.

While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIGS. 5-16 are diagrams illustrating example subframe structures for preamble transmission on an unlicensed spectrum.

DETAILED DESCRIPTION

Figure 1:
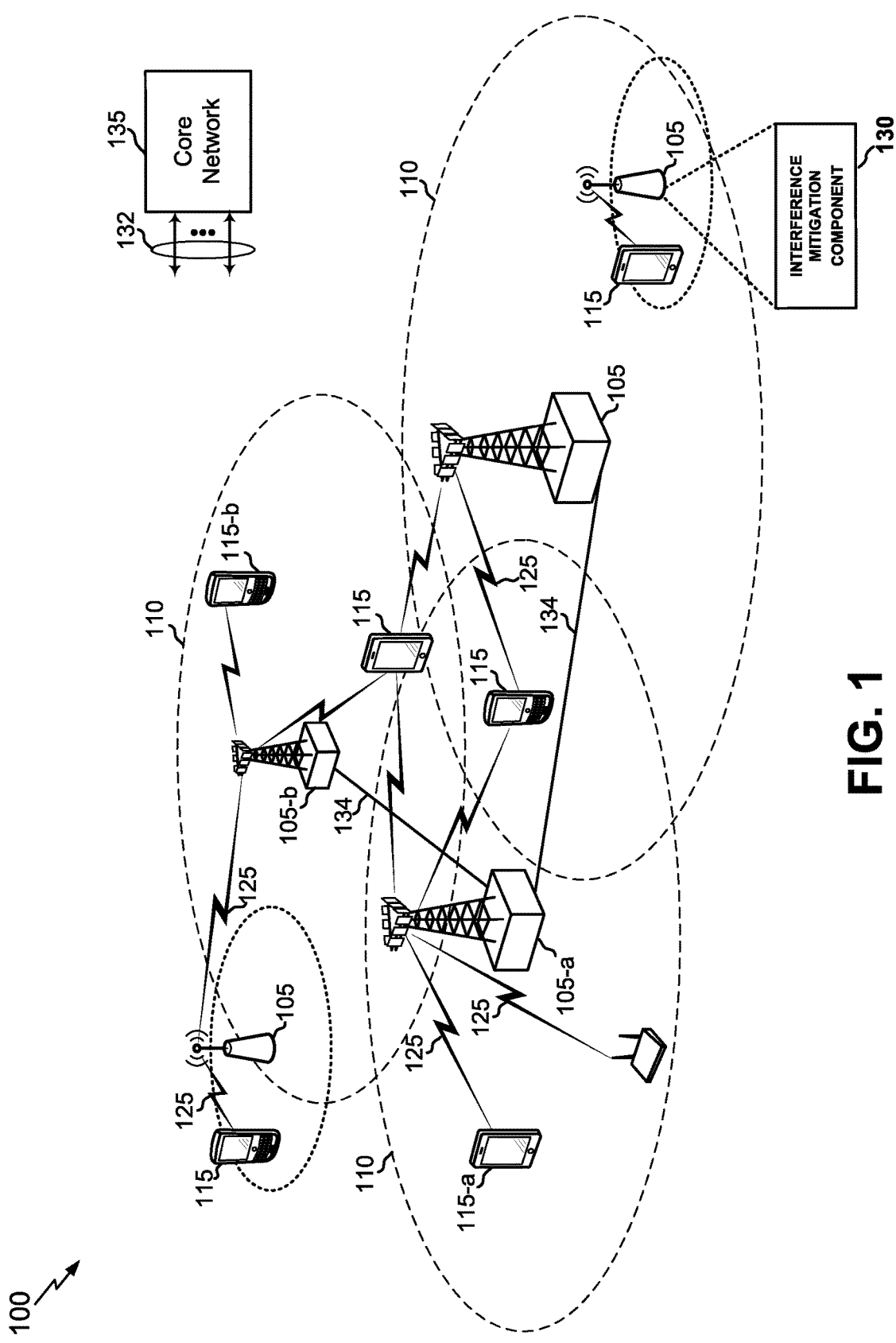
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to configuring preamble transmissions to maintain synchronization with other network entities (e.g., nodes, access points, etc.) operating in an unlicensed spectrum during wireless communications. In particular, for example, single frequency network (SFN) transmissions in enhanced multimedia broadcast multicast service (eMBMS) are effective for achieving high broadcast capacity with all network entities being configured to transmit the same data in a synchronized configuration. As such, there is a need to extend eMBMS to the unlicensed spectrum (e.g., eMBMS-U) in order to allow for single transmissions to multiple UEs with SFN gain in the unlicensed spectrum. During eMBMS-U configuration network entities are synchronized by performing a listen-before talk (LBT) procedure with a clear channel assessment (CCA) or extended CCA (eCCA) at the same time (e.g., at a resynchronization or resync boundary) to not block each other. Further, only a subset of the network entities need to access the unlicensed spectrum (e.g., contention-based spectrum) in order to transmit the identical data. This leads to a variable SFN deployment. Moreover, in an aspect, network entities may refer to small cells with a cyclic prefix (CP) based eMBMS-U.

Further, preamble transmissions have been established to indicate the state of the transmission burst in license assisted acquisition (LAA). For example, before actual data transmission, a node (e.g., a UE or a network entity) may transmit a preamble to indicate the start of the transmission burst, automatic gain control (AGC), and any additional information which may need to be signaled, such as but not limited to, burst duration. Moreover, partial subframe transmission may be configured in LAA wherein a node (e.g., a UE or a network entity) may obtain access to a medium (e.g., unlicensed spectrum), and the data transmission, excluding the preamble, does not need to be subframe aligned. This results in a smaller overhead compared to subframe aligned data transmission. However, due to the configuration of multicast-broadcast single-frequency network (MBSFN), all network entities are required to transmit the same data synchronously. As such a preamble transmitted to indicate the start of transmission burst may need to be adjusted in order to avoid interference with MBSFN transmissions.

Accordingly, in some aspects, the present methods and apparatuses may provide an efficient solution, as compared to current solutions, by configuring preamble transmissions to maintain synchronization with other network entities operating in an unlicensed spectrum during wireless communications. In other words, in the present aspects, a network entity may interfere with MBSFN transmission by another network entity engage in joint transmissions if one of the network entities accesses the unlicensed spectrum after a resynchronization boundary. As such, the present aspects provide one or more mechanisms for adjusting preamble transmissions in order avoid interference with MBSFN transmissions. Moreover, the present aspects also provide one or more mechanisms for accessing, by a second network entity, a unlicensed spectrum currently accessed by a first network entity transmitting a first burst of data; and transmitting, by the second network entity, a second burst of data over the accessed medium, the second burst of data having an associated preamble configured not to interfere with a joint transmission portion of the first burst of data.

In an aspect, a network entity may mitigate interference during a joint transmission portion of a first burst of a data by another network entity. For example, when two or more network entities engage in joint transmissions in an unlicensed spectrum the transmission of a preamble may need to be configured in order to mitigate interference. In one aspect, the preamble is not transmitted by one of the network entities, where both network entities are eMBMS nodes operating in an unlicensed spectrum (eMBMS-U). However, the preamble may be required for MBSFN transmission and unicast reception. Without preamble transmission, any UEs served by network entities may not be aware of the start of MBSFN and unicast transmissions. In another aspect, the preamble is transmitted for unicast transmission and/or reception. For example, a network entity that completes the CCA after the resynchronization boundary may transmit the preamble after MBSFN transmissions occur, embed the preamble in a unicast transmission that occurs after the MBSFN transmissions occur, or reserve a plurality of resource elements in each MBSFN subframe for transmitting the preamble. In this example, the UE served by the network entity may not be indicated on the start of the MBSFN transmission and therefore are required to monitor each potential MBSFN subframe. In another aspect, all network entities transmitting MBSFN subframes may transmit MBSFN and unicast preambles. For example, the MBSFN preamble may be transmitted to indicate the start of the MBSFN subframes. The MBSFN preamble may be based on the MBSFN area identifier and/or a public land mobile network (PLMN) ID, and may benefit from MBSFN gain. A UE may monitor MBSFN preamble in addition to monitoring regular preambles. Further, the entire transmission burst may be dedicated to MBSFN transmissions, and the network entities may perform CCA after the MBSFN dedicated burst in order to start a new unicast burst. The CCA parameters for the MBSFN burst transmissions may differ from those for the unicast burst transmissions. For example, the CCA energy detection (ED) threshold may be higher for MBSFN than for unicast. The CCA initial counter may be smaller for MBSFN.

Referring first to FIG. 1, a diagram illustrates an example of a wireless communications system 100, in accordance with aspects described herein. The wireless communications system 100 includes a plurality of base stations (e.g., eNBs, WLAN access points, or other access points) 105, a number of user equipment (UEs) 115, and a core network 135. One or more base stations 105 may include an interference mitigation component 130 (see e.g., FIG. 4) operable to configure preamble transmissions to maintain synchronization with other network entities operating in an unlicensed spectrum. In an aspect, interference mitigation component 130 may configured the preamble transmissions so that any UEs served by network entities may be aware of the start of MBSFN and unicast transmissions.

Accordingly, for example, the UEs 115 may communicate with one another (e.g., with or without the assistance of a base station 105 to schedule resources) using a direct message-based communication. Some of the base stations 105 may communicate with the UEs 115 under the control of a base station controller (not shown), which may be part of the core network 135 or the certain base stations 105 (e.g., eNBs) in various examples. Base stations 105 may communicate control information and/or user data with the core network 135 through backhaul links 132. In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies (RAT). The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In LTE/LTE-Advanced (LTE-A), for example, the terms evolved Node B (eNodeB or eNB) may be generally used to describe the base stations 105. The wireless communications system 100 may be a Heterogeneous LTE/LTE-A network in which different types of access points provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 135 may communicate with the eNBs or other base stations 105 via a backhaul links 132 (e.g., S1 interface, etc.). The base stations 105 may also communicate with one another, e.g., directly or indirectly via backhaul links 134 (e.g., X2 interface, etc.) and/or via backhaul links 132 (e.g., through core network 135). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, a vehicle-based UE, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The UEs 115 may be configured to collaboratively communicate with multiple base stations 105 through, for example, Multiple Input Multiple Output (MIMO), carrier aggregation (CA), Coordinated Multi-Point (CoMP), multiple connectivity, or other schemes. MIMO techniques use multiple antennas on the base stations 105 and/or multiple antennas on the UEs 115 to transmit multiple data streams.

Figure 2:
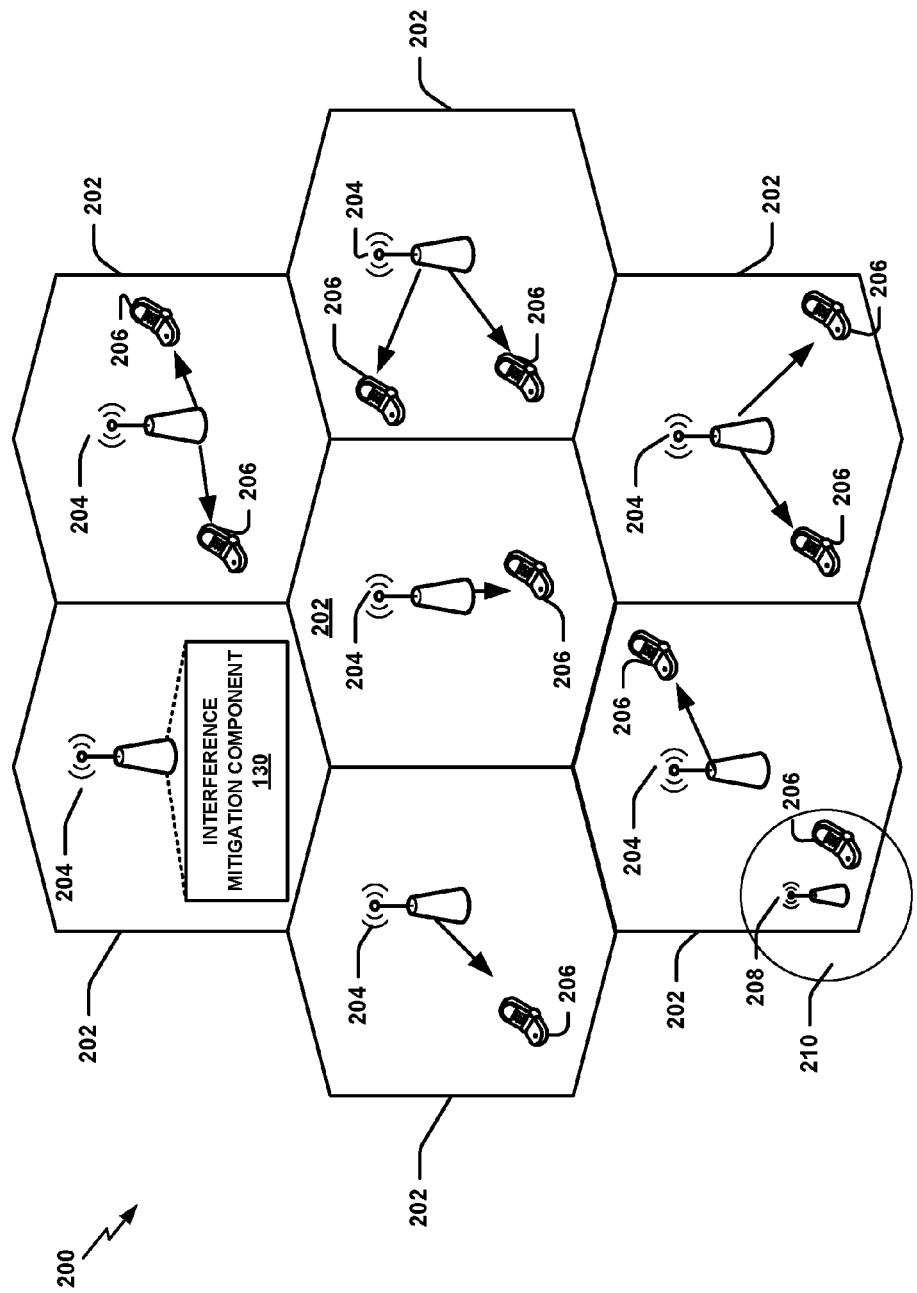
FIG. 2 is a diagram illustrating an example of an access network.

FIG. 2 is a diagram illustrating an example of an access network 200 in an LTE network architecture or similar cellular network architecture. In this example, the access network 200 is divided into a number of cellular regions (cells) 202. One or more lower power class base stations 208 may have cellular regions 210 that overlap with one or more of the cells 202. The lower power class base stations 208 may be a femto cell (e.g., home eNB (HeNB)), pico cell, micro cell, or remote radio head (RRH). The macro base stations 204 are each assigned to a respective cell 202 and are configured to provide an access point to the core network 135 for all the UEs 206 in the cells 202.

In an aspect, one or more base stations 204/208 may include an interference mitigation component 130 (see e.g., FIG. 4) operable to configure preamble transmissions to maintain synchronization with other network entities operating in an unlicensed spectrum. There is no centralized controller in this example of an access network 200, but a centralized controller may be used in alternative configurations. The base stations 204 are responsible for all radio related functions including radio bearer control, admission control, mobility control, scheduling, security, and connectivity to one or more components of core network 135.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 204 may have multiple antennas supporting MIMO technology. The use of MIMO technology enables the base stations 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the base stations 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
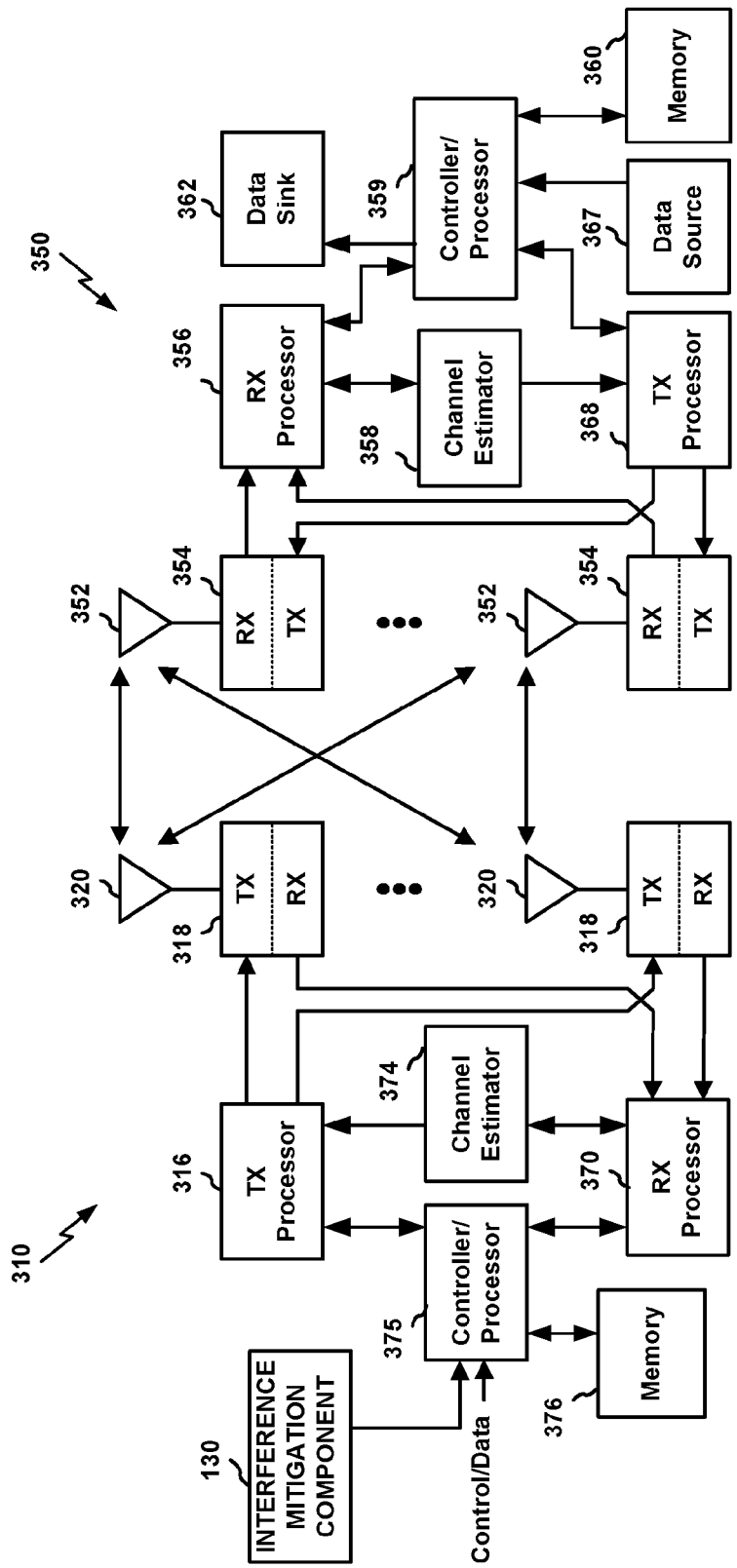
FIG. 3 is a diagram illustrating an example of an evolved Node B and user equipment in an access network.

FIG. 3 is a block diagram of a base station 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics.

The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, base station 310 may include a interference mitigation component 130 (see e.g., FIG. 4) operable to configure preamble transmissions to maintain synchronization with other network entities operating in an unlicensed spectrum. Though interference mitigation component 130 is shown as coupled to controller/processor 375, it is to be appreciated that interference mitigation component 130 can also be coupled to other processors (e.g., RX processor 370, TX processor 316, etc.) and/or implemented by the one or more processors 316, 370, 375 to perform actions described herein. Furthermore, for example, interference mitigation component 130 may be implemented by any one or more of the processors including, but not limited to, processors 316, 370, and/or 375. Similarly, interference mitigation component 130 may be implemented by any one or more of the processors including, but not limited to, processors 356, 359, and/or 368.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
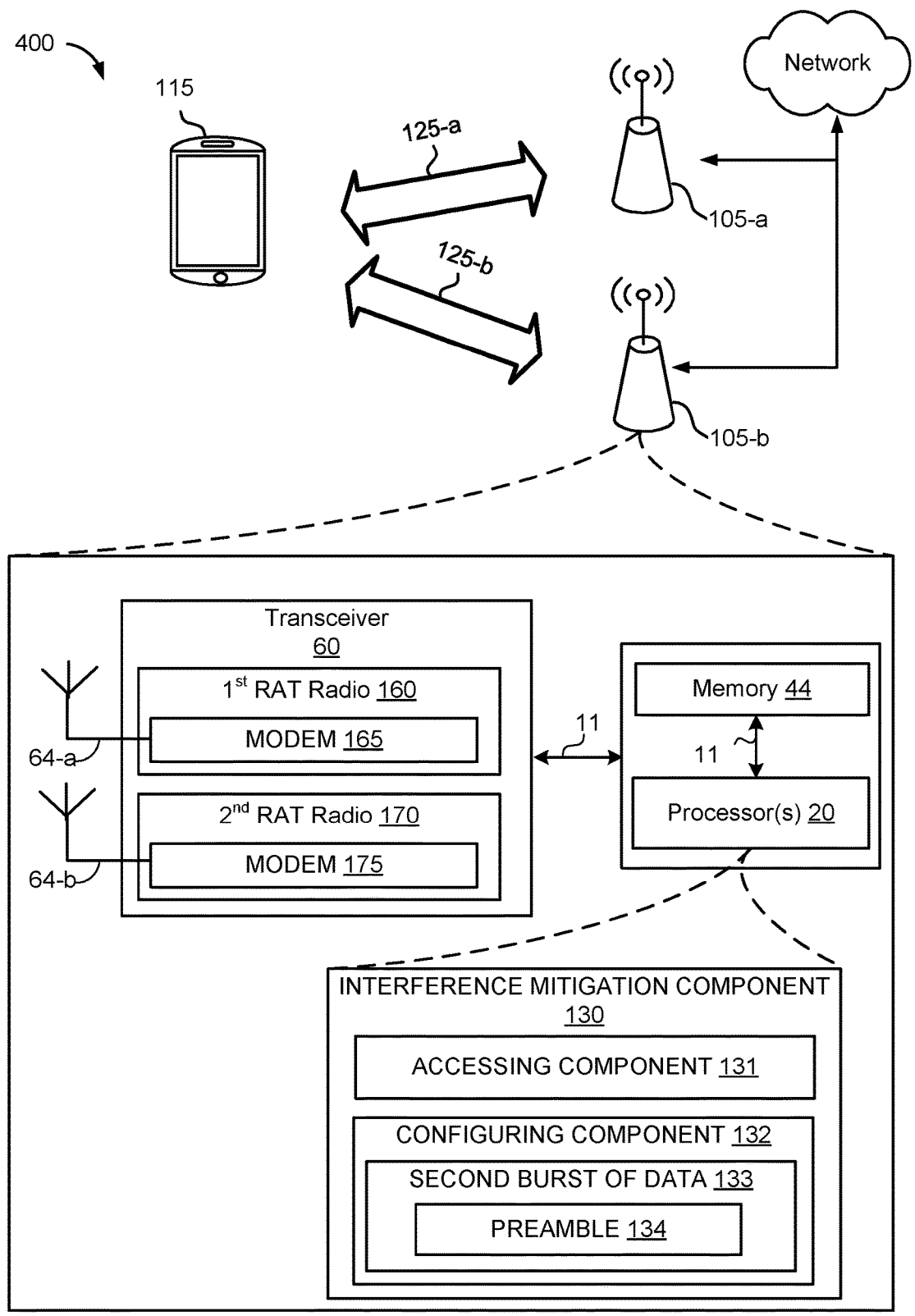
FIG. 4 is a schematic diagram of a communication network including an aspect of adjusting preamble and partial subframe transmissions to maintain synchronization with other network entities operating in an unlicensed spectrum during wireless communications in accordance with various aspects of the present disclosure.

Referring to FIG. 4, in an aspect, a wireless communication system 400 includes at least one user equipment (UE) 115 in communication coverage of at least network entities 105-a and 105-b. The UE 115 may communicate with network via network entity 105-b and/or network entity 105-a. In an example, UE 115 may transmit and/or receive wireless communication to and/or from network entities 105-a, 105-b via one or more communication channels 125-*a*, 125-*b*, which may include an uplink communication channel (or simply uplink channel) and a downlink communication channel (or simply downlink channel), such as but not limited to an uplink data channel and/or downlink data channel. Such wireless communications may include, but are not limited to, data, audio and/or video information.

In accordance with the present disclosure, network entity 105-*b* (and/or network entity 105-*a*) may include a memory 44, one or more processors 20 and a transceiver 60. The memory, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the network entity 105-*b*. In some examples, the one or more processors 20 may include any one or combination of modem processor, baseband processor, digital signal processor and/or transmit processor. Additionally or alternatively, the one or more processors 20 may include an interference mitigation component 130 for carrying out one or more methods or procedures described herein. The interference mitigation component 130 may comprise hardware, firmware, and/or software and may be configured to execute code or perform instructions stored in a memory (e.g., a computer-readable storage medium).

In some examples, the network entity 105-*b* (and/or network entity 105-*a*) may include the memory 44, such as for storing data used herein and/or local versions of applications or communication with interference mitigation component 130 and/or one or more of its subcomponents being executed by the one or more processors 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium (e.g., a non-transitory medium) that stores one or more computer-executable codes defining interference mitigation component 130 and/or one or more of its subcomponents, and/or data associated therewith, when network entity 105-*b* is operating processor 20 to execute interference mitigation component 130 and/or one or more of its subcomponents. In some examples, the network entity 105-*b* may further include a transceiver 60 for transmitting and/or receiving one or more data and control signals to/from the network via UE 115. The transceiver 60 may comprise hardware, firmware, and/or software and may be configured to execute code or perform instructions stored in a memory (e.g., a computer-readable storage medium). The transceiver 60 may include a $1^{st}$ radio access technology (RAT) radio 160 comprising a modem 165, and a $2^{nd}$ RAT radio 170 (e.g., LTE radio) comprising a modem 175. The $1^{st}$ RAT radio 160 and $2^{nd}$ RAT radio 170 may utilize one or more antennas 64 for transmitting signals to and receiving signals from the UE 115. In an example, $1^{st}$ RAT radio 160 may be associated with a wireless local area network (WLAN) and $2^{nd}$ RAT radio 170 may be associated with a wireless wide area network (WWAN) over unlicensed spectrum.

When the network entity 105-*b* (or any other devices in the system 400) uses a first RAT to communicate on a given resource, this communication may be subjected to interference from nearby devices that use a second RAT to communicate on that resource. For example, communication by the UE 115 via LTE using second RAT radio 170 on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context.

When network entity 105-*b* (and/or network entity 105-*a*) sends downlink transmissions to UE 115, assigned resources on the downlink frequency band are utilized. For example, the network entity 105-*b* operating in an unlicensed RF band may be assigned an interlace of resource blocks (RBs) in which downlink data transmissions may be sent. In order to avoid collisions with other network entities in a contention based downlink channel, the network entity 105-*b* may send a preamble. For convenience, LTE on an unlicensed RF band may be referred to herein as LTE/LTE Advanced in unlicensed spectrum, or simply LTE in the surrounding context. Moreover, LTE operating over an unlicensed spectrum may refer to the use or modification of LTE to operate in a contention-based communication system that uses a shared medium.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In a blended radio environment such as system 400, different RATs may make use of different channels at different times. Because different RATs are sharing the spectrum and operating partly independently of others, access to one channel may not imply access to another channel. Accordingly, a device capable of transmitting using multiple channels may need to determine whether each channel is available before transmitting. In order to increase bandwidth and throughput, it may be beneficial in some situations to wait for an additional channel to become available rather than transmitting using currently available channel(s).

In some examples, the interference mitigation component 130 may be configured to adjust preamble transmissions to maintain synchronization with other network entities operating in an unlicensed spectrum during wireless communications. In an aspect, for example, interference mitigation component 130 may be configured to adjust the downlink transmissions of network entity 105-*b* when network entity 105-*b* is configured in eMBMS-U with one or more other network entities (e.g., network entity 105-*a*) and is transmitting to UE 115. For example, interference mitigation component 130 may maintain synchronization between network entity 105-*b* and network entity 105-*a* engaged in a joint transmission to UE 115 by ensuring that network entity 105-*b* and network entity 105-*a* are transmitting the same contents within MBSFN subframes to UE 115 across unlicensed communication channels 125-*a* and 125-*b*. Interference mitigation component 130 may maintain synchronization even if network entity 105-*b* completes a clear channel assessment (CCA) late (e.g., after the resynchronization boundary).

In an aspect, interference mitigation component 130 may include an accessing component 131 which may be configured to access an unlicensed spectrum currently accessed by a first node transmitting a first burst of data. For example, network entity 105-*a* and network entity 105-*b* may be eMBMS nodes configured for joint transmission to a UE 115. Network entity 105-*a* may have completed a CCA upon a resynchronization boundary and has accessed an unlicensed spectrum (e.g., unlicensed spectrum) via communication channel 125-*a*. Network entity 105-*a* may be transmitting a first burst of data to UE 115 on the unlicensed spectrum. Moreover, access component 131 may access the unlicensed spectrum that is currently being accessed by network entity 105-*a* that is transmitting the first burst of data to UE 115. In some instances, network entity 105-*b* and/or accessing component 131 may access the unlicensed spectrum via communication channel 125-*b* before, at, or after a resynchronization boundary associated with the one or more eMBMS nodes (e.g., network entity 105-*a* and 105-*b*). In the instances where network entity 105-*b* and/or accessing component 131 access the unlicensed spectrum by the resynchronization boundary, then network entity 105-*b* should be synchronized with the other eMBMS nodes (e.g., network entity 105-*a*). However, if network entity 105-*b* and/or access component 131 access the unlicensed spectrum after the resynchronization boundary then the network entity 105-*b* and/or interference mitigation component 130 may need to configure transmissions and the preamble in order to avoid interference with joint transmission portion of the first burst of data by network entity 105-*a*.

In an aspect, interference mitigation component 130 may configure transceiver 60 to transmit a second burst of data 133 over the access medium. For example, transceiver 60 may transmit, a second burst of data 133 over the access medium wherein the second burst of data 133 having an associated preamble 134 configured not to interfere with the joint transmission portion of the first burst of data by network entity 105-*a*. Network entity 105-*b* and/or transceiver 60 may be configured to transmit the second burst of data 133 including transmitting one or more downlink unicast subframes and one or more MBSFN subframes. The MBSFN subframes may be configured such that they are always subframe aligned, so network entity 105-*b* and/or transceiver 60 may only begin MBSFN data transmissions at a subframe boundary.

Furthermore, interference mitigation component 130 may include configuring component 132, which may configure preamble 134 and the transmission of the preamble 134. For example, configuring component 132 may configure preamble 134 associated with the second burst of data 133 to be transmitted by network entity 105-*b* before the joint transmission portion of the first burst of data is transmitted by network entity 105-*a* (e.g., see FIG. 6). In another example, configuring component 132 may configure preamble 134 associated with the second burst of data 133 to be transmitted by network entity 105-*b* after the joint transmission portion of the first burst of data is transmitted by network entity 105-*a* (e.g., see FIGS. 8 and 9). In another example, configuring component 132 may configure preamble 134 associated with the second burst of data 133 to be transmitted by network entity 105-*b* during the joint transmission portion of the first burst of data is transmitted by network entity 105-*a* (e.g., see FIG. 10). In other aspects, the preamble 134 associated with the second burst of data 133 is a first preamble and network entity 105-*a* transmits a second preamble prior to transmitting the first burst of data to UE 115 (e.g., see FIG. 11). In this aspect, the first preamble is a unicast preamble and the second preamble is an MBSFN preamble. Network entity 105-*a* may also transmit a third preamble after transmitting the first burst of data. The third preamble may also be a unicast preamble (e.g., see FIGS. 11-13).

Additionally, as used herein, the one or more wireless nodes, including, but not limited to, network entities 105-*a* and 105-*b* of wireless communication system 400, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 400 may include one or more small cell base stations, such as, but not limited to a femtocell, picocell, microcell, or any other base station having a relatively small transmit power or relatively small coverage area as compared to a macro base station.

FIG. 5 is a diagram 500 illustrating an example downlink transmissions by two nodes of two or more nodes (e.g., eMBMS nodes) engaged in joint transmissions (e.g., MBSFN transmissions) in an unlicensed spectrum. In an aspect, diagram 500 illustrates a scenario wherein the preamble (such as preamble 134 of FIG. 4) is transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a CCA (not shown) at the same time (e.g., by the resynchronization boundary), and as such, begin transmitting a first burst of data to a UE (e.g., UE 115 of FIG. 4) including a preamble, downlink unicast data, and MBSFN data. Because both Nodes 1 and 2 complete the CCA and access the medium at the same, Nodes 1 and 2 may transmit MBSFN data without interference from other types of data along with preambles, unicast data transmissions, and receive uplink transmissions as well. In an aspect, the MBSFN data may correspond to MBSFN subframes.

Figure 6:
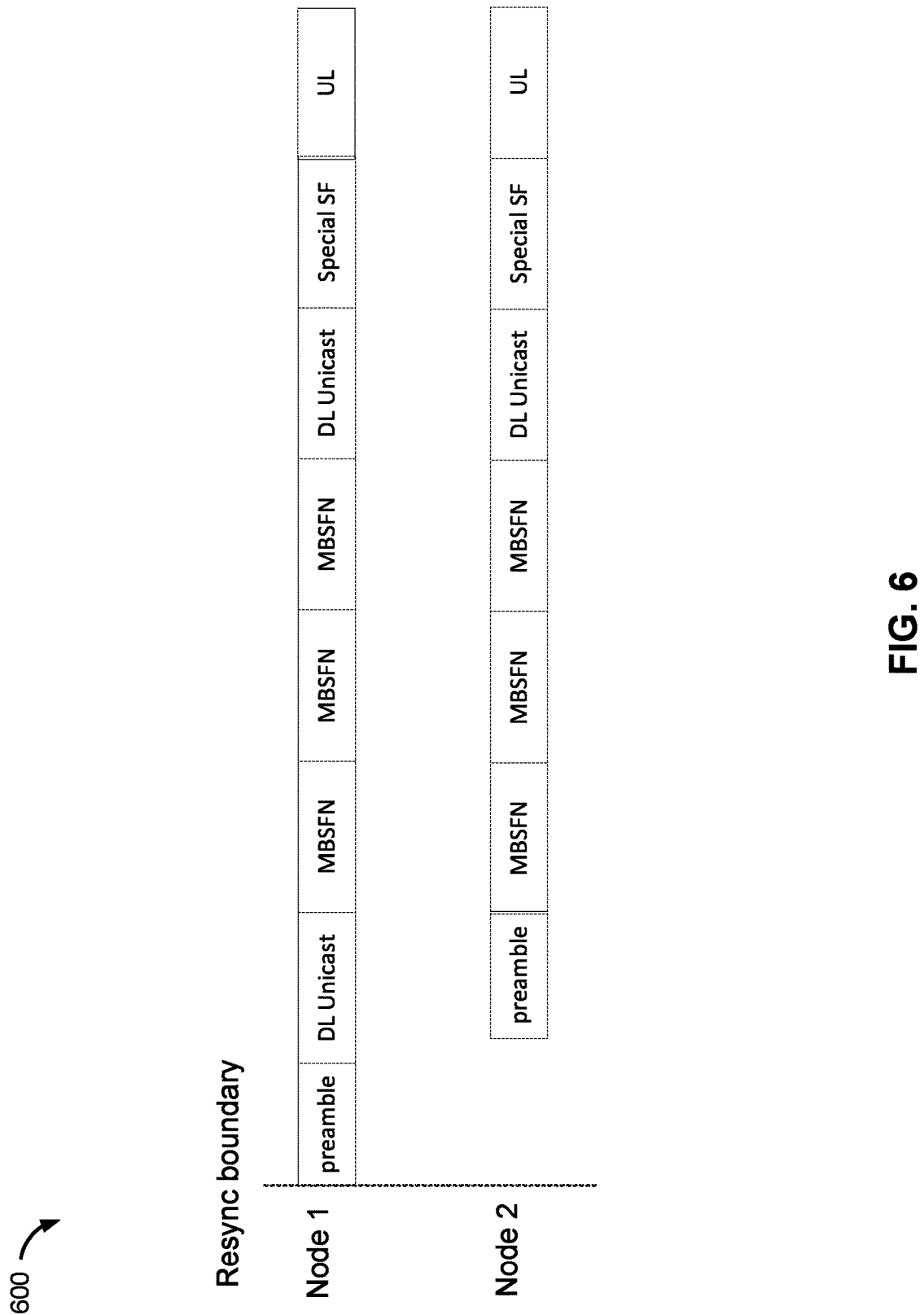

FIG. 6 is a diagram 600 illustrating an example downlink transmissions by two nodes of two or more nodes engaged in joint transmissions. In an aspect, diagram 600 illustrates a scenario wherein the preamble (such as preamble 134 of FIG. 4) is transmitted by Node 1 (e.g., network entity 105-a of FIG. 4) and Node 2 (e.g., network entity 105-b of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting a first burst of data to a UE (e.g., UE 115 of FIG. 4) prior to Node 2. Due to completing the CCA after the resynchronization boundary but before Node 1 transmits MBSFN data, Node 2 may transmit the preamble as well before Node 1 begins transmitting MBSFN data instead of transmitting downlink unicast data. Node 2 may obtain the MBSFN subframe configuration from a network entity and use such information to determine whether Node 1 may start transmitting MBSFN data.

In an aspect, interference mitigation component 130 (FIG. 4) may be configured to be executed by Node 2 to configure preamble transmissions to maintain synchronization with Node 1. For example, interference mitigation component 130 may access the unlicensed spectrum currently accessed by Node 1 that is transmitting a first burst of data. As such, interference mitigation component 130 may trigger Node 2 to transmit a second burst of data over the unlicensed spectrum. The second burst of data may have an associated preamble configured not to interfere with a joint transmission portion of the first burst of data. In this instance, interference mitigation component 130 may configure Node 2 to transmit the preamble before Node 1 transmits MBSFN data since the MBSFN data transmissions have not begun after Node 2 has completed the CCA.

Figure 7:
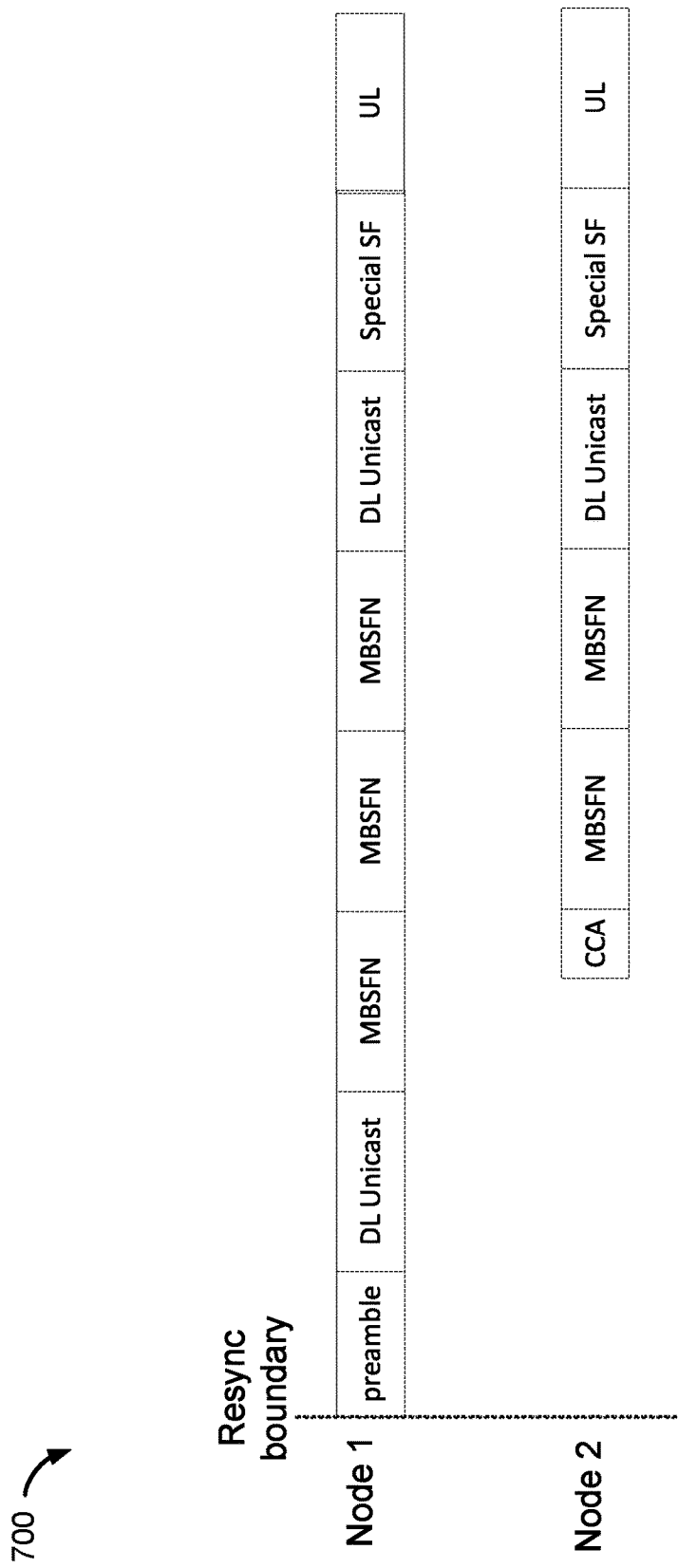

FIG. 7 is a diagram 700 illustrating an example downlink transmissions by two nodes of two or more nodes engaged in joint transmissions in an unlicensed spectrum. In an aspect, diagram 700 illustrates a scheme wherein the preamble (such as preamble 134 of FIG. 4) is not transmitted by Node 1 (e.g., network entity 105-a of FIG. 4) and Node 2 (e.g., network entity 105-b of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA (shown) after the resynchronization boundary. As such, Node 1 begins transmitting bursts of data to a UE (e.g., UE 115 of FIG. 4) prior to Node 2. Due to completing the CCA after the resynchronization boundary and after Node 1 transmits MBSFN data, Node 2 may not transmit the preamble due to potentially interfering with MBSFN data transmission being transmitted by Node 1. As such, since preamble transmission cannot occur, unicast transmission and reception may be affected. However, Node 2 may still transmit MBSFN and unicast data and also receive uplink data.

Figure 8:
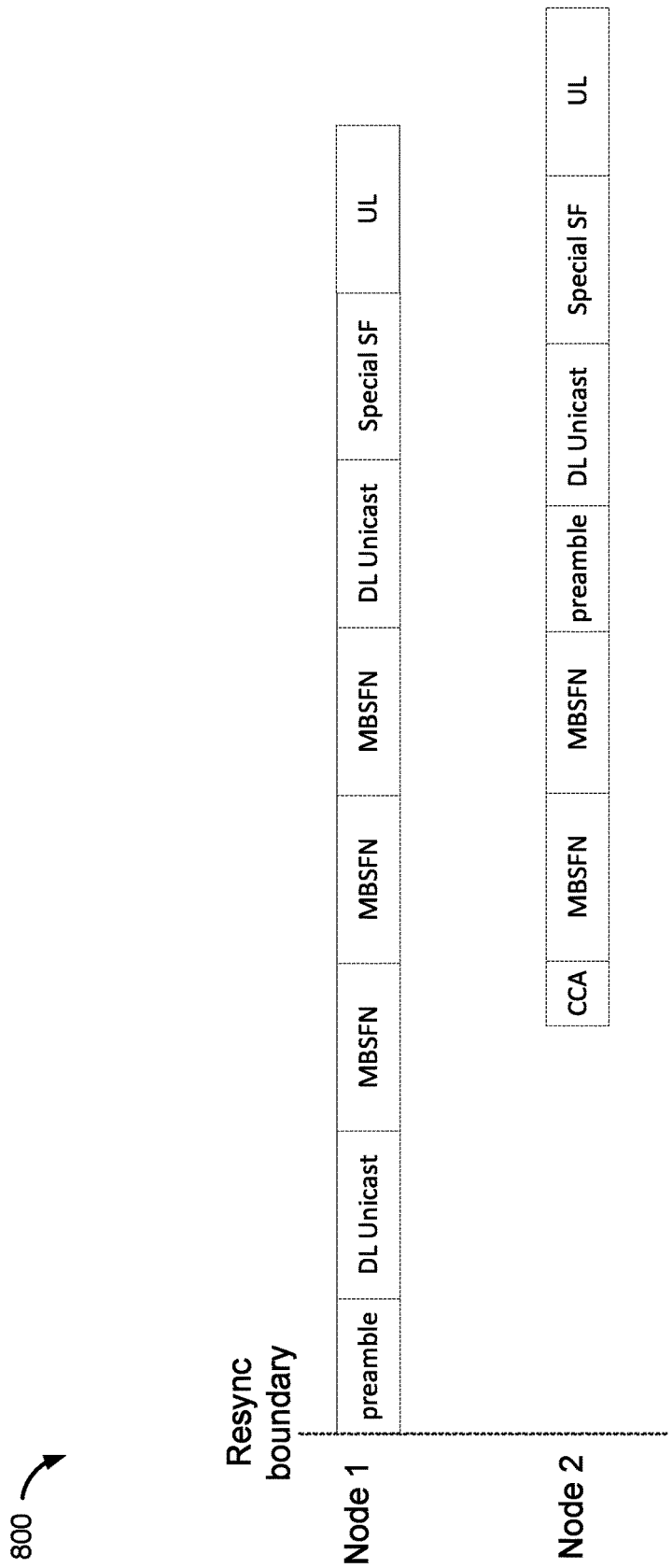

FIG. 8 is a diagram 800 illustrating an example downlink transmissions by two nodes of two or more nodes engaged in joint transmissions in an unlicensed spectrum. In an aspect, diagram 800 illustrates a scheme wherein the preamble (such as preamble 134 of FIG. 4) is transmitted by Node 1 (e.g., network entity 105-a of FIG. 4) and Node 2 (e.g., network entity 105-b of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. Due to completing the CCA after the resynchronization boundary and after Node 1 transmits MBSFN data, Node 2 may not transmit the preamble (e.g., unicast preamble) until after transmitting the MBSFN data due to potentially interfering with MBSFN data being transmitted by Node 1. As such, Node 2 transmits the preamble after Node 1 completes transmitting the MBSFN data for subsequent unicast transmissions and receptions.

Figure 9:
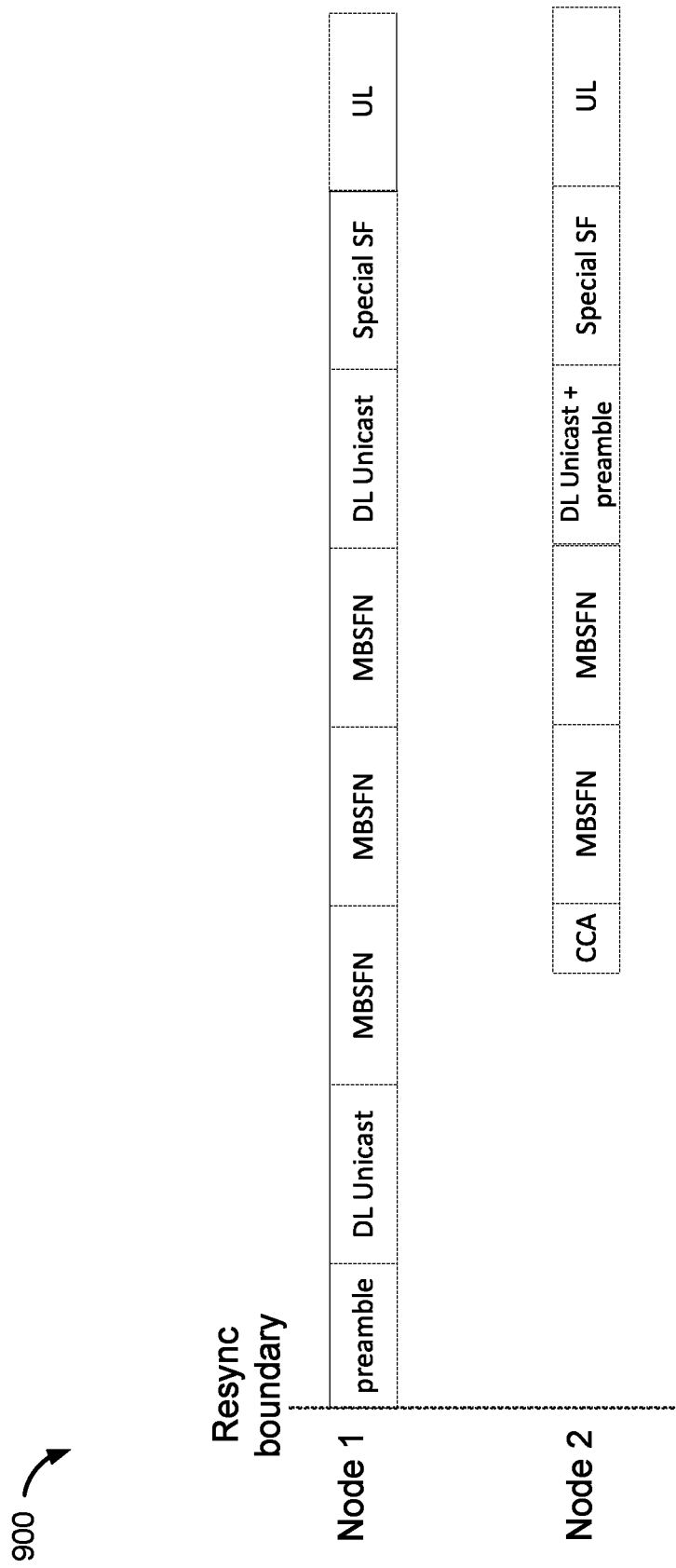

FIG. 9 is a diagram 900 illustrating an example downlink transmissions by two nodes of two or more nodes engaged in joint transmissions in an unlicensed spectrum. In an aspect, diagram 900 illustrates a scheme wherein the preamble (such as preamble 134 of FIG. 4 is transmitted by Node 1 (e.g., network entity 105-a of FIG. 4) and Node 2 (e.g., network entity 105-b of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. Due to completing the CCA after the resynchronization boundary and after Node 1 transmits MBSFN data, Node 2 may not transmit the preamble until after the MBSFN subframes due to potentially interfering with MBSFN data being transmitted by Node 1. As such, Node 2 transmits the preamble by embedding the preamble in a downlink unicast transmission (e.g., block shown as "DL Unicast+preamble") after Node 1 completes transmitting the MBSFN data.

Figure 10:
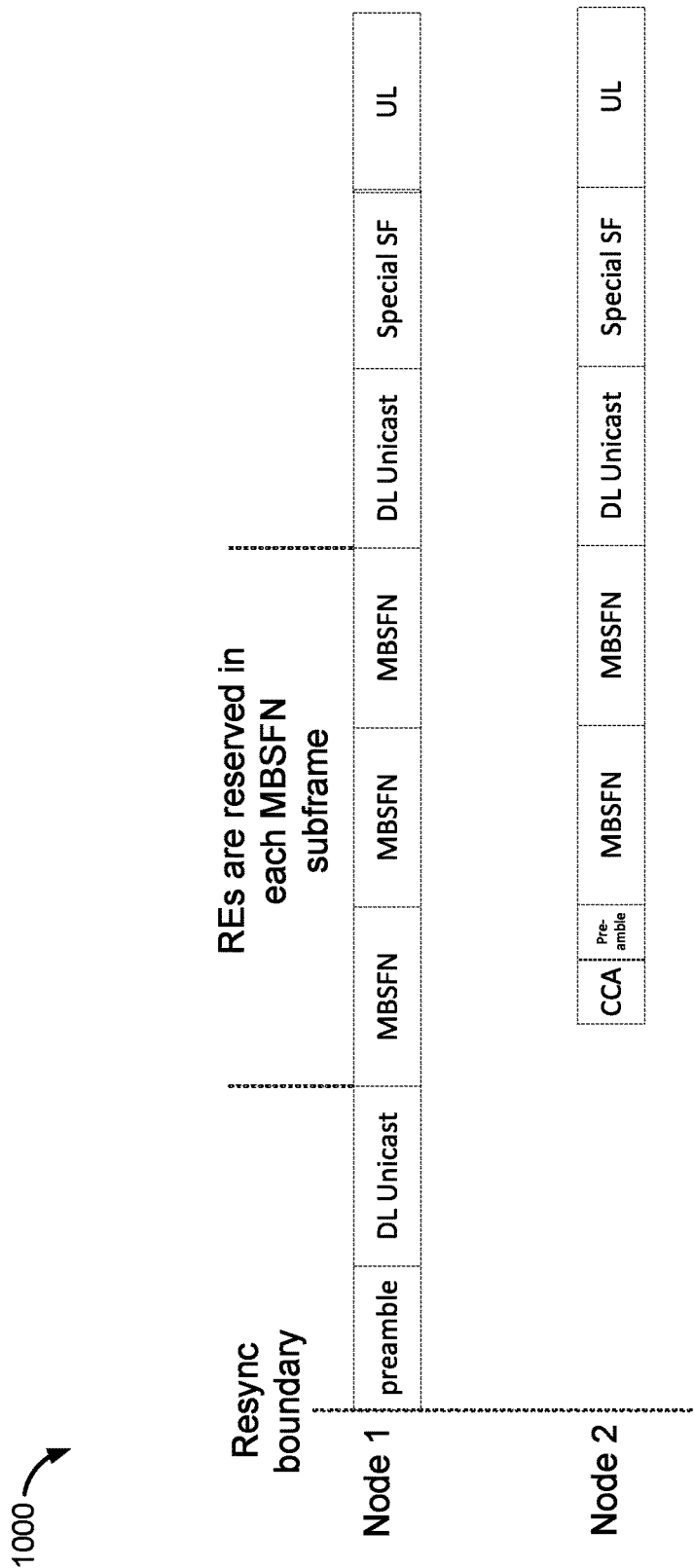

FIG. 10 is a diagram 1000 illustrating an example downlink transmissions by two nodes of two or more nodes engaged in joint transmissions in an unlicensed spectrum. In an aspect, diagram 1000 illustrates a scheme wherein the preamble (such as preamble 134 of FIG. 4) is transmitted by Node 1 (e.g., network entity 105-a of FIG. 4) and Node 2 (e.g., network entity 105-b of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. In this example, resource elements are reserved in each MBSFN subframe for nodes that complete CCA after the resynchronization boundary in order to be able to transmit a preamble without interference. In some instances, the resource elements to be used for preamble transmission without interference may be identified based on the MBSFN area identifier or the PLMN identifier. Due to completing the CCA after the resynchronization boundary and after Node 1 transmits MBSFN subframes, Node 2 transmits the preamble in the reserved resource elements of a MBSFN subframe so as to avoid interference with the MBSFN subframes being concurrently transmitted by Node 1.

Figure 11:
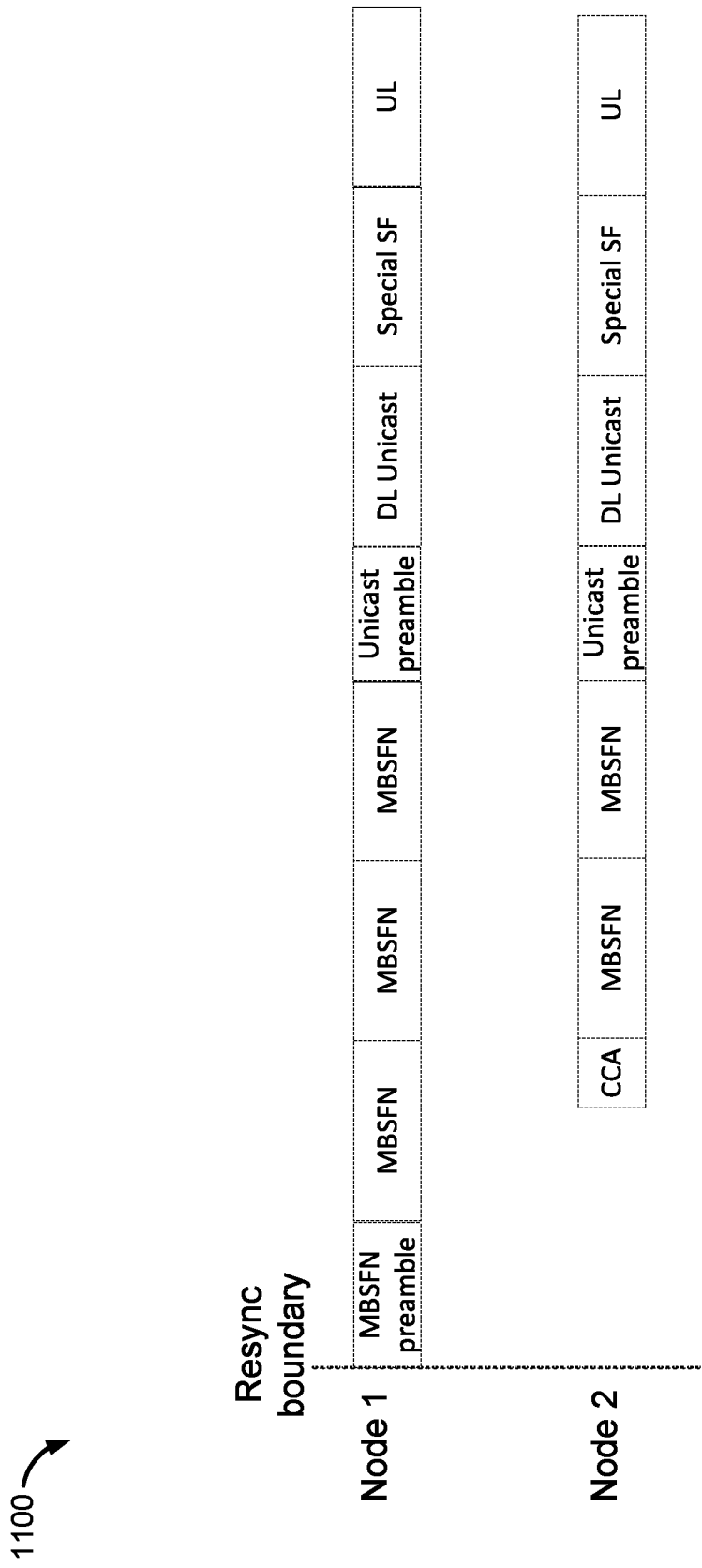

FIG. 11 is a diagram 1100 illustrating an example downlink transmissions by two nodes of two or more nodes engaged in joint transmissions in an unlicensed spectrum. In an aspect, diagram 1100 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. In this example, Node 1 transmits a MBSFN preamble prior to transmitting the MBSFN subframes. Node 2 may complete the CCA (shown) while Node 1 is transmitting MBSFN subframes. As such, Node 2 may transmit one or more MBSFN subframes as well, and then transmit a unicast preamble after the MBSFN subframes. While Node 2 transmits the unicast preamble, Node 1 may concurrently transmit a unicast preamble. Node 2 does not transmit the MBSFN preamble due to completing the CCA after the resynchronization boundary.

Figure 12:
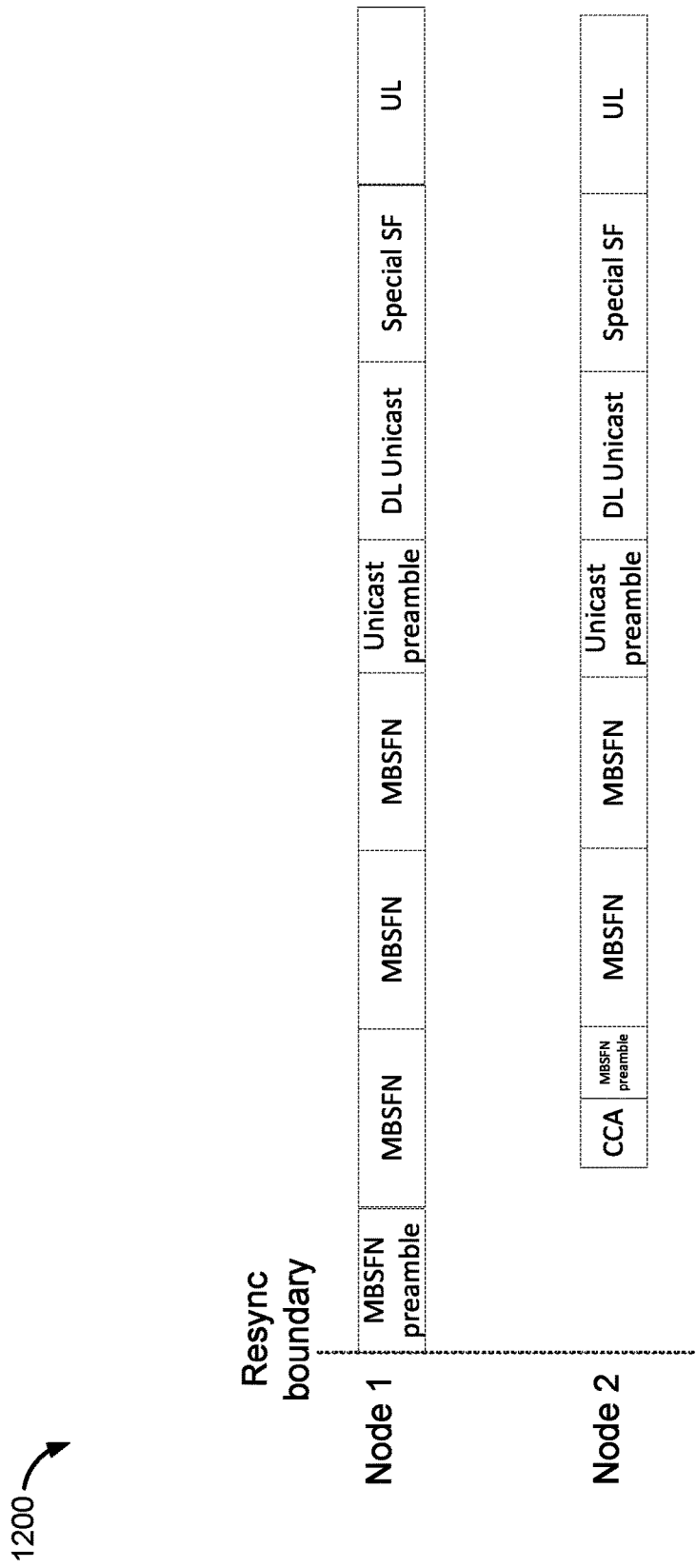

FIG. 12 is a diagram 1200 illustrating an example downlink transmissions by two nodes of two or more nodes engaged in joint transmissions in an unlicensed spectrum. In an aspect, diagram 1200 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. In this example, Node 1 transmits a MBSFN preamble prior to transmitting the MBSFN subframes. Node 2 may complete the CCA while Node 1 is transmitting MBSFN subframes. As such, Node 2 may transmit one or more MBSFN subframes as well, and then transmit a unicast preamble along with Node 1 after the MBSFN subframes. Node 2 also transmits the MBSFN preamble within resource elements dedicated for late nodes (e.g., nodes completing a CCA after the resynchronization boundary) to transmit MBSFN preambles and that are not used for MBSFN transmission. Therefore, a UE served by a late node (e.g., Node 2) has an indication for when an MBSFN transmission begins.

Figure 13:
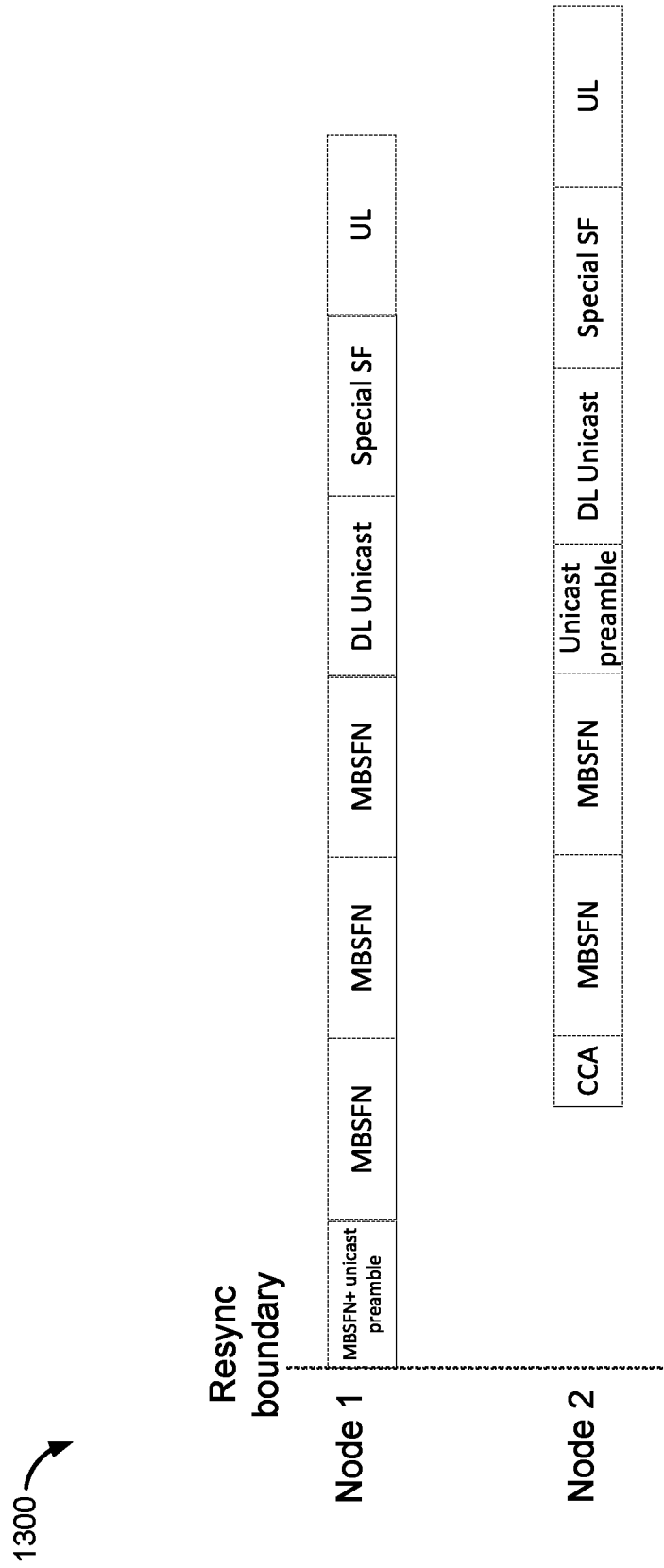

FIG. 13 is a diagram 1300 illustrating an example downlink transmissions by two nodes of two or more nodes engaged in joint transmissions in an unlicensed spectrum. In an aspect, diagram 1300 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. In this example, Node 1 transmits a combination unicast and MBSFN preamble (wherein the unicast preamble is multiplexed with the MBSFN preamble) prior to transmitting the MBSFN subframes. Node 2 may complete the CCA while Node 1 is transmitting MBSFN subframes. As such, Node 2 may transmit one or more MBSFN subframes as well, and then transmit a unicast preamble after the MBSFN subframes. Node 2 does not transmit the MBSFN preamble due to completing the CCA after the resynchronization boundary.

Figure 14:
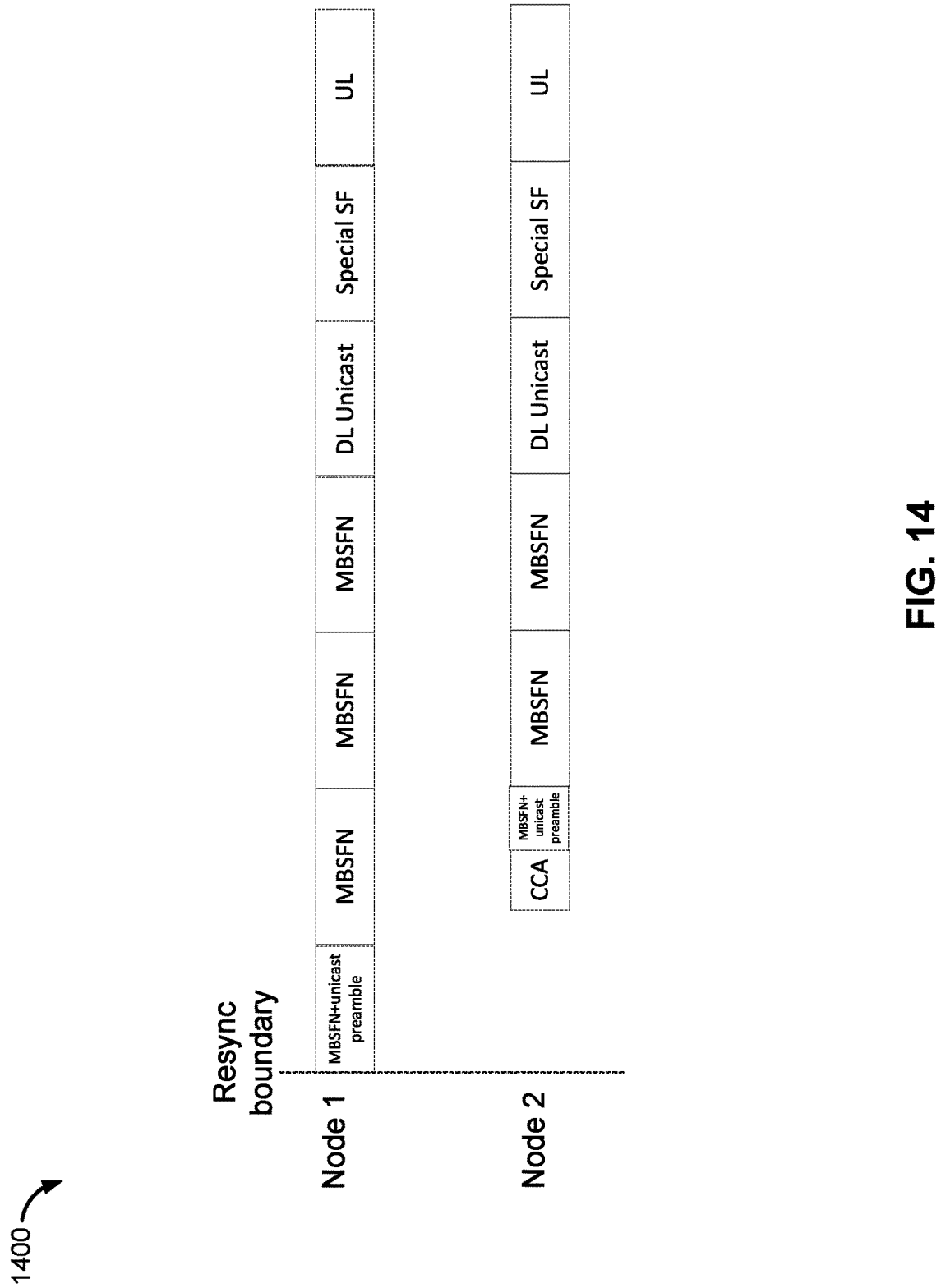

FIG. 14 is a diagram 1400 illustrating an example downlink transmissions by two nodes of two or more nodes engaged in joint transmissions in an unlicensed spectrum. In an aspect, diagram 1400 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a CCA, but Node 1 completes the CCA on time (e.g., by the resynchronization boundary) and Node 2 completes the CCA after the resynchronization boundary. As such, Node 1 begins transmitting bursts of data to a UE (e.g., UE 115 of FIG. 4) prior to Node 2. In this example, Node 1 transmits a combination unicast and MBSFN preamble (wherein the unicast preamble is multiplexed with the MBSFN preamble) prior to transmitting the MBSFN subframes. Node 2 may complete the CCA while Node 1 is transmitting MBSFN subframes. As such, Node 2 also transmits the combination unicast and MBSFN preamble within resource elements dedicated for late nodes to transmit combination unicast and MBSFN preambles and that are not used for MBSFN transmission. Therefore, a UE served by a late node (e.g., Node 2) has an indication for when a unicast and MBSFN transmissions begin.

Figure 15:
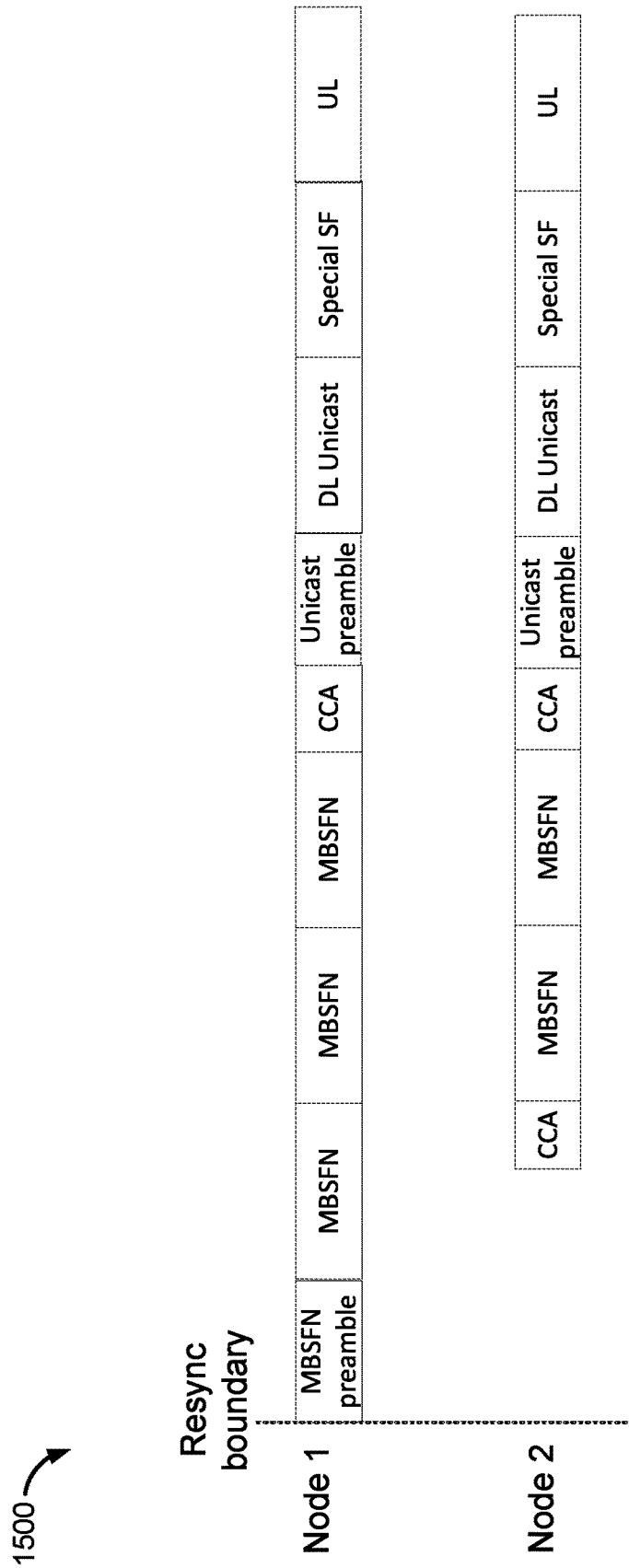

FIG. 15 is a diagram 1500 illustrating an example downlink transmissions by two nodes of two or more nodes engaged in joint transmissions in an unlicensed spectrum. In an aspect, diagram 1500 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a first CCA, but Node 1 completes the first CCA on time (e.g., by the resynchronization boundary) and Node 2 completes the first CCA after the resynchronization boundary. As such, Node 1 begins transmitting bursts of data to a UE (e.g., UE 115 of FIG. 4) prior to Node 2. In this example, Node 1 transmits a MBSFN preamble prior to transmitting the MBSFN subframes. Node 2 may complete the first CCA while Node 1 is transmitting MBSFN subframes. As such, Node 2 also transmits the remaining MBSFN subframes without transmitting a MBSFN preamble prior to the MBSFN data transmission. After the transmission of the MBSFN subframes is completed, all the nodes perform a second CCA and transmit a unicast preamble upon completion (e.g., clearing or successfully passing) of the CCA. In this example, the CCA parameter may be different for the transmitting the MBSFN subframes compared to that for the unicast subframes. For example, the CCA energy detection requirement may be higher for MBSFN transmissions than for unicast transmissions.

Figure 16:
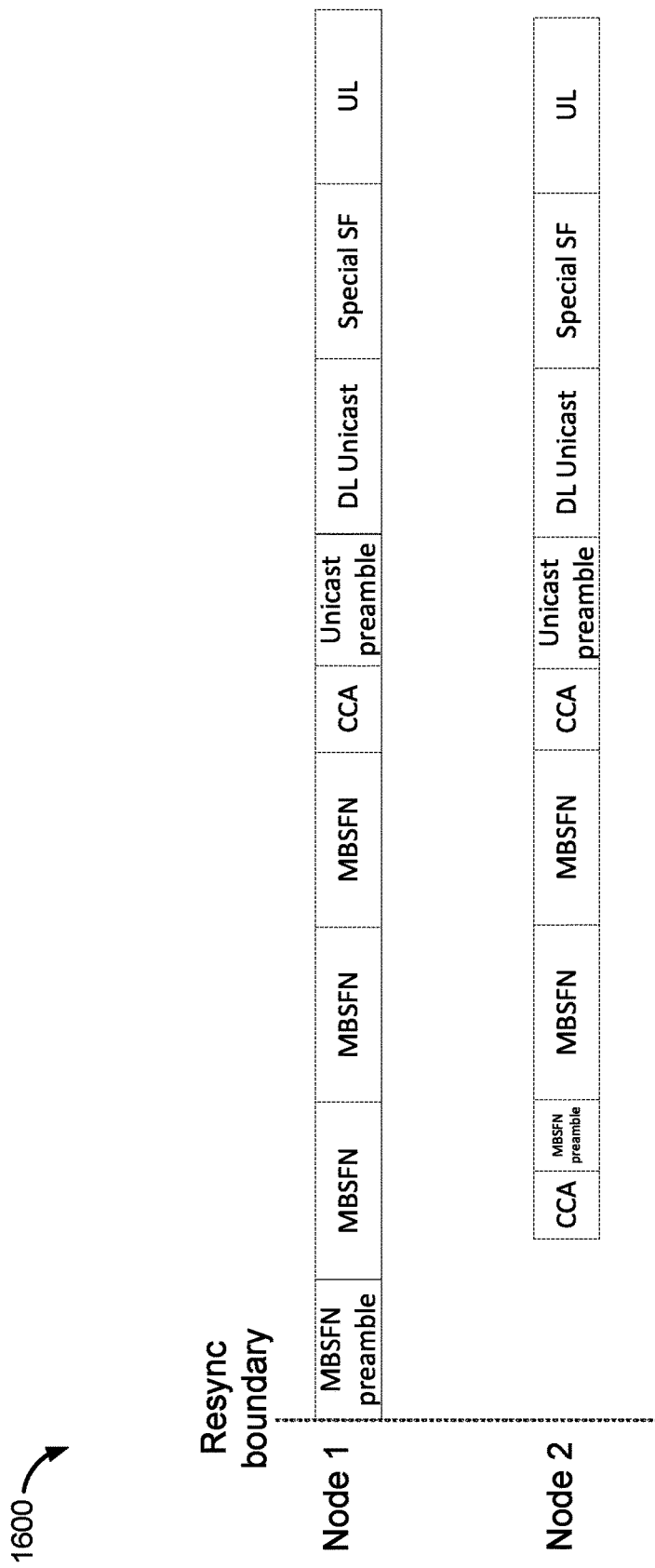

FIG. 16 is a diagram 1600 illustrating an example downlink transmissions by two nodes of two or more nodes engaged in joint transmissions in an unlicensed spectrum. In an aspect, diagram 1600 illustrates a scheme wherein two types of preambles (such as preamble 134 of FIG. 4) are transmitted by Node 1 (e.g., network entity 105-*a* of FIG. 4) and Node 2 (e.g., network entity 105-*b* of FIG. 4), where both Node 1 and Node 2 are eMBMS nodes operating in an unlicensed spectrum (eMBMS-U). For example, Nodes 1 and 2 both complete a first CCA, but Node 1 completes the first CCA on time (e.g., by the resynchronization boundary) and Node 2 completes the first CCA after the resynchronization boundary. As such, Node 1 begins transmitting bursts of data to a UE (e.g., UE 115 of FIG. 4) prior to Node 2. In this example, Node 1 transmits a MBSFN preamble prior to transmitting the MBSFN subframes. Node 2 may complete the first CCA while Node 1 is transmitting MBSFN subframes. As such, Node 2 also transmits the remaining MBSFN subframes along with the MBSFN preamble within resource elements dedicated for late notes to transmit MBSFN preambles and that are not used for MBSFN transmission. After the transmission of the MBSFN subframes is completed, all the nodes perform a second CCA and transmit a unicast preamble upon completion of the CCA. In this example, the CCA parameter may be different for the transmitting the MBSFN subframes compared to that for the unicast subframes. For example, the CCA energy detection requirement may be higher for MBSFN transmissions than for unicast transmissions.

Figure 17:
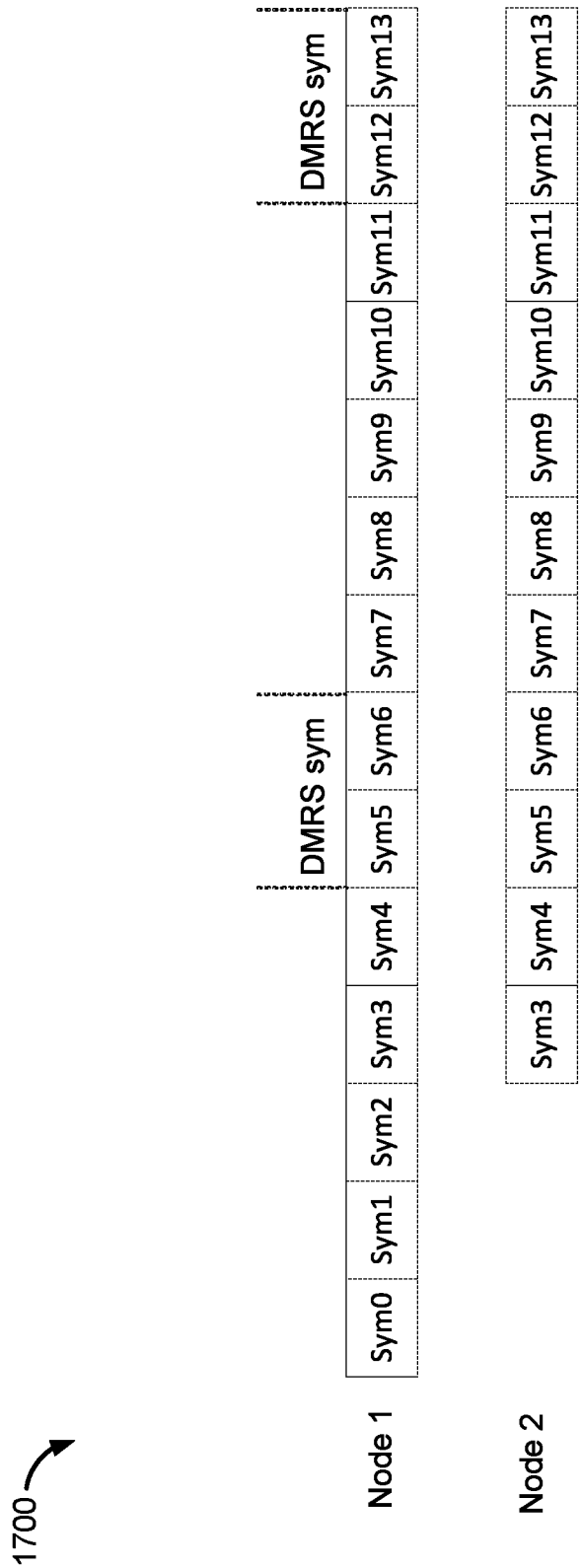
FIG. 17 is a diagram illustrating an example downlink transmission by two nodes engaged in joint transmission in an unlicensed spectrum.

FIG. 17 is a diagram 1700 illustrating an example downlink transmissions by two nodes of two or more nodes engaged in joint transmissions in an unlicensed spectrum. In an aspect, diagram 1700 illustrates a scheme for partial subframe transmission by one or more nodes (e.g., network entity 105-*a* and 105-*b* of FIG. 4), wherein both Nodes 1 and 2 are eMBMS-U nodes. For example, partial subframe transmission with MBSFN transmission provides for different MBSFN gains on different symbols which may cause traffic-to-pilot ratio (TPR) mismatch. Therefore, MBSFN needs to be subframe aligned. In this example, since Node 2 fails to transmit symbols 0, 1, 2, symbols 0, 1, 2 (which are transmitted by Node 1) may have different SFN gains compared to other data and RS symbols which may cause TPR mismatch and performance degradation. Alternatively, the TPR mismatch with partial MBSFN subframe transmission may not cause performance degradation where the data is modulated with QPSK and there is a single layer transmission. In this case, network may choose to send partial MBSFN subframe.

Figure 18:
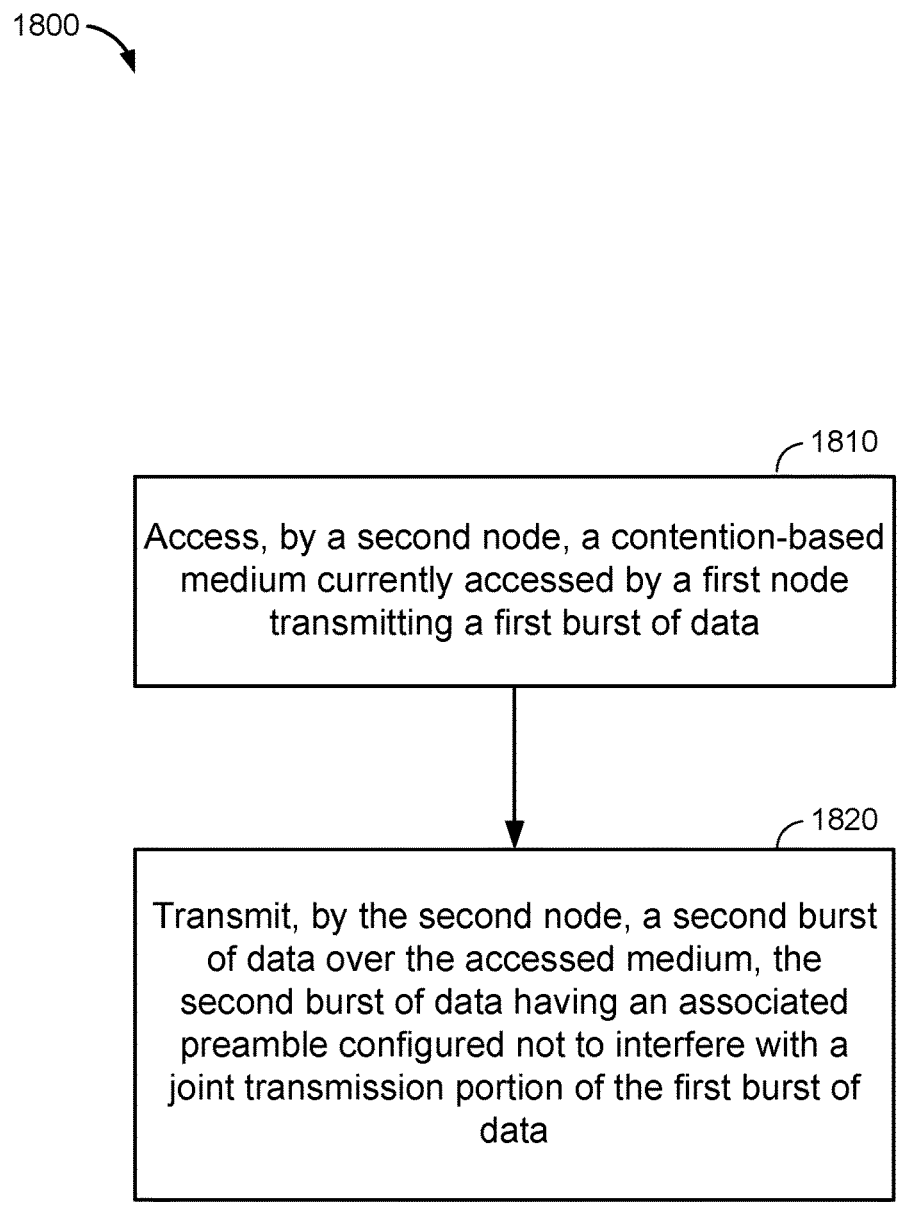
FIG. 18 is flow diagram illustrating an example method of adjusting preamble transmissions to maintain synchronization with other network entities operating in an unlicensed spectrum during wireless communications.

Referring to FIG. 18, an example of one or more operations and/or an example of architectural layout and components and subcomponents (FIG. 4) of an aspect of interference mitigation component 130 (FIG. 4) according to the present apparatus and methods are described with reference to one or more methods and one or more components that may perform the actions of these methods. Although the operations described below are presented in a particular order and/or as being performed by an example component, it should be understood that the ordering of the actions and the components performing the actions may be varied, depending on the implementation. Also, although the interference mitigation component 130 is illustrated as having a number of subcomponents, it should be understood that one or more of the illustrated subcomponent may be separate from, but in communication with, the interference mitigation component 130 and/or each other. Moreover, it should be understood that the following actions or components described with respect to the interference mitigation component 130 and/or its subcomponents may be performed by a specially-programmed processor, a processor executing specially-programmed software or computer-readable media, or by any other combination of a hardware component and/or a software component specially configured for performing the described actions or components.

In an aspect, at block 1810, method 1800 includes accessing, by a second node, an unlicensed spectrum currently accessed by a first node transmitting a first burst of data. In an aspect, for example, UE 115, may execute interference mitigation component 130 (FIG. 4) and/or an accessing component 131 to access an unlicensed spectrum (e.g., an unlicensed spectrum via communication channel 125-*b*) currently accessed by a first node (e.g., network entity 105-*a*) transmitting a first burst of data. In a further aspect, processing system 2014 (FIG. 20), processor 2004, and/or memory 2006 may execute interference mitigation component 1920, or may perform at least some of the functions of interference mitigation component 1920, to access an unlicensed spectrum (e.g., an unlicensed spectrum via communication channel 125-*b*) currently accessed by a first node (e.g., network entity 105-*a*) transmitting a first burst of data.

In an aspect, at block 1820, method 1800 includes transmitting, by the second node, a second burst of data over the accessed medium, the second burst of data having an associated preamble configured not to interfere with a joint transmission portion of the first burst of data. In an aspect, for example, UE 115, may execute interference mitigation component 130 (FIG. 4) and/or a transceiver 60 to transmit a second burst of data 133 over the accessed medium, the second burst of data having an associated preamble 134 configured not to interfere with a joint transmission portion of the first burst of data. In a further aspect, processing system 2014 (FIG. 20), processor 2004, and/or memory 2006 may execute interference mitigation component 1920 and/or transmission component 1912, or may perform at least some of the functions of interference mitigation component 1920 and/or transmission component 1912, to transmit a second burst of data 133 over the accessed medium, the second burst of data having an associated preamble 134 configured not to interfere with a joint transmission portion of the first burst of data.

Figure 19:
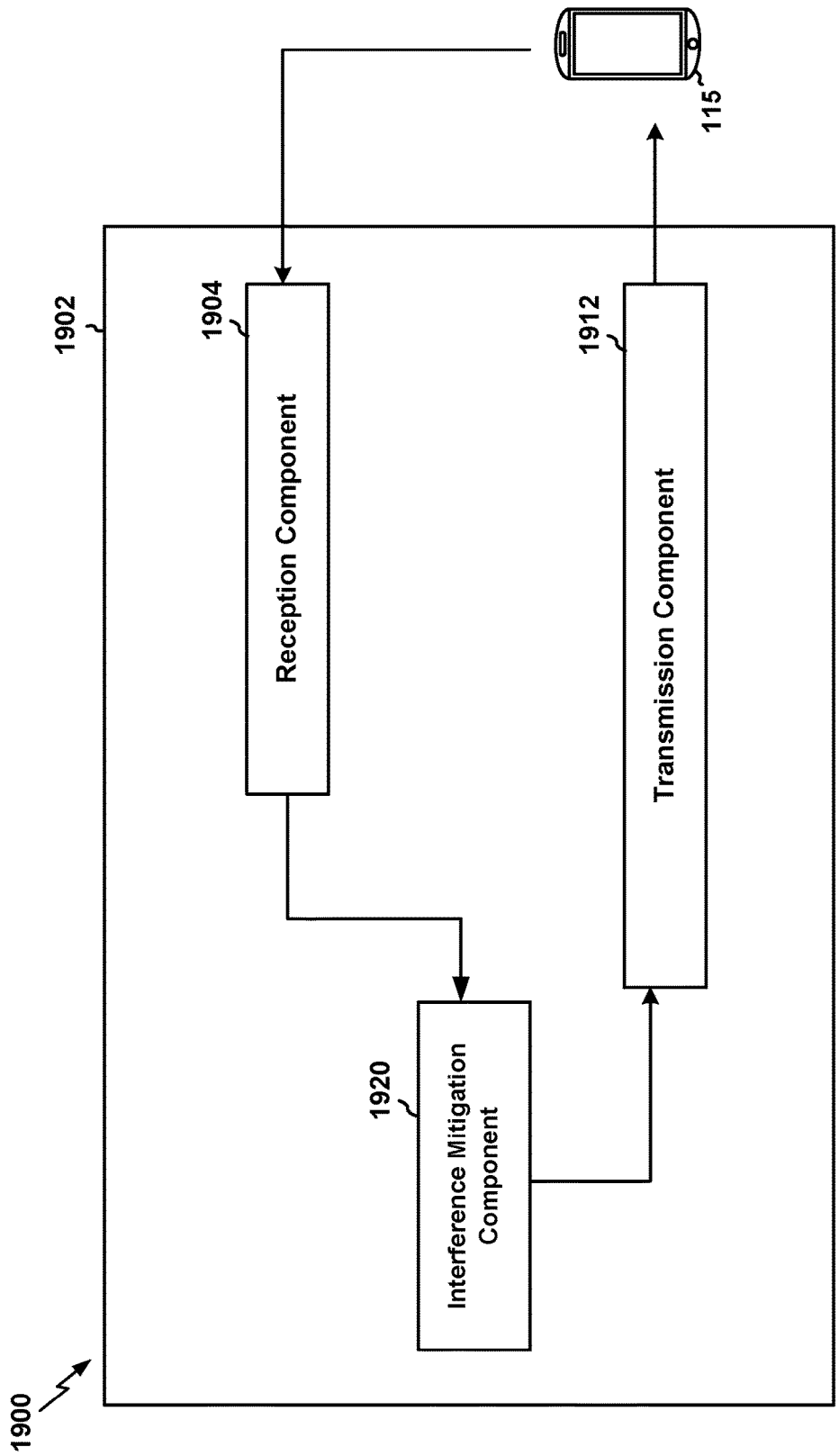
FIG. 19 is a conceptual data flow diagram illustrating the data flow between different means/components in an exemplary apparatus including a interference mitigation component in accordance with various aspects of the present disclosure.

FIG. 19 is a conceptual data flow diagram 1900 illustrating the data flow between different means/components in an exemplary apparatus 1902 that includes interference mitigation component 1920, which may be the same as or similar to interference mitigation component 130. The apparatus 1902 may be a base station, which may include base station 105 of FIGS. 1 and 4. The apparatus 1902 includes interference mitigation component 1920 that, in an aspect, accesses, by a second node, a contention-based medium currently accessed by a first node transmitting a first burst of data. The apparatus 1902 further includes a transmission component 1912 that transmits, by the second node, a second burst of data over the accessed medium, the second burst of data having an associated preamble configured not to interfere with a joint transmission portion of the first burst of data. Further, apparatus 1902 includes reception component 1904 that receives one or more signals from at least one of the one or more UEs.

The apparatus may include additional components that perform each of the blocks of the algorithm in the aforementioned flowcharts of FIG. 19. As such, each block in the aforementioned flowcharts of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
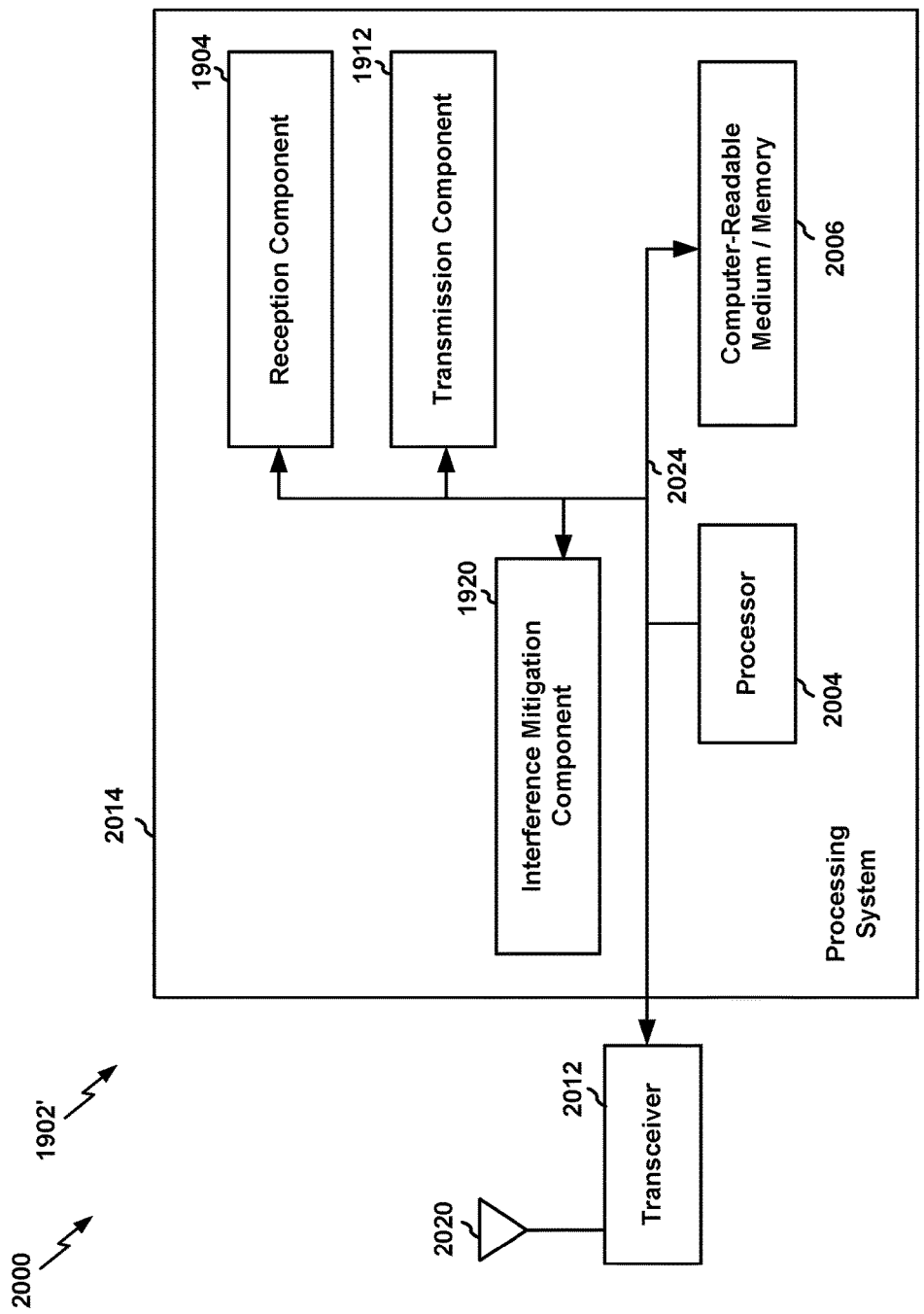
FIG. 20 is a diagram illustrating an example of a hardware implementation for an apparatus employing a processing system including a interference mitigation component in accordance with various aspects of the present disclosure.

FIG. 20 is a diagram 2000 illustrating an example of a hardware implementation for an apparatus 1902' employing a processing system 2014 that includes interference mitigation component 1920 (FIG. 19), which may be the same as or similar to interference mitigation component 130 (FIG. 4). The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, which may be the same as or similar to processor(s) 375 (FIG. 3) and/or 21 (FIG. 4), the components 1904, 1912, and 1920, and the computer-readable medium/memory 2006, which may be the same as or similar to memory 376 (FIG. 3) and/or 45 (FIG. 4). The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1912, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1912, and 1920. The components may be software components running in the processor 2004, resident/stored in the computer readable medium/memory 2006, one or more hardware components coupled to the processor 2004, or some combination thereof.

In one configuration, the apparatus 2000/1902' for wireless communication includes means for accessing, by a second node, a contention-based medium currently accessed by a first node transmitting a first burst of data. The apparatus includes means for transmitting, by the second node, a second burst of data over the accessed medium, the second burst of data having an associated preamble configured not to interfere with a joint transmission portion of the first burst of data.

The aforementioned means may be one or more of the aforementioned components of the apparatus 1902' and/or the processing system 2014 of the apparatus 802' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for wireless communications, comprising:
   accessing, by a second node, a contention-based medium currently accessed by a first node transmitting a first burst of data to at least one user equipment (UE), the first node and second node being configured to transmit on a joint transmission portion of the contention-based medium to the at least one UE; and
   transmitting, by the second node, a second burst of data over the contention-based medium to the at least one UE, the second burst of data having an associated preamble configured not to interfere with the joint transmission portion of the first burst of data.

2. The method of claim 1, wherein:
   the first node and the second node are enhanced-multimedia broadcast multicast services (eMBMS) nodes, and
   the joint transmission portion of the first burst of data includes transmission of one or more multicast-broadcast single-frequency network (MBSFN) data.

3. The method of claim 1, wherein transmitting the second burst of data comprises transmitting one or more downlink unicast subframes and one or more MBSFN data.

4. The method of claim 1, further comprising configuring the preamble associated with the second burst of data to be transmitted by the second node before the joint transmission portion of the first burst of data is transmitted by the first node.

5. The method of claim 1, further comprising configuring the preamble associated with the second burst of data to be transmitted by the second node after the joint transmission portion of the first burst of data is transmitted by the first node.

6. The method of claim 1, further comprising configuring the preamble associated with the second burst of data to be transmitted by the second node during the joint transmission portion of the first burst of data using one or more resource elements not used by the joint transmission portion of the first burst of data.

7. The method of claim 1, wherein the first node accesses the medium at a resynchronization boundary associated with a plurality of eMBMS nodes including the first node and the second node.

8. The method of claim 1, wherein:
   the preamble associated with the second burst of data is a first preamble, and
   the first nodes transmits a second preamble prior to transmitting the first burst of data.

9. The method of claim 8, wherein:
   the first preamble is a unicast preamble,
   the second preamble is an MBSFN preamble, and
   the first node transmits a third preamble after transmitting the first burst of data, the third preamble being a unicast preamble.

10. The method of claim 9, wherein the second node transmits a fourth preamble after transmitting the first burst of data, the fourth preamble being a unicast preamble.

11. The method of claim 8, wherein the first and second preamble are unicast preambles.

12. The method of claim 8, wherein the first and second preambles are MBSFN and unicast preambles.

13. The method of claim 1, wherein the contention-based medium is associated with an unlicensed or shared spectrum.

14. An apparatus for wireless communications, comprising:
    a memory configured to store instructions, and
    one or more processors communicatively coupled with the memory, wherein the one or more processors are configured to execute the instructions to:
       access, by a second node, a contention-based medium currently accessed by a first node transmitting a first burst of data to at least one user equipment (UE), the first node and second node being configured to transmit on a joint transmission portion of the contention-based medium to the at least one UE; and
       transmit, by the second node, a second burst of data over the contention-based medium to the at least one UE, the second burst of data having an associated preamble configured not to interfere with the joint transmission portion of the first burst of data.

15. The apparatus of claim 14, wherein:
    the first node and the second node are enhanced-multimedia broadcast multicast services (eMBMS) nodes, and
    the joint transmission portion of the first burst of data includes transmission of one or more multicast-broadcast single-frequency network (MBSFN) data.

16. The apparatus of claim 14, wherein transmitting the second burst of data comprises transmitting one or more downlink unicast subframes and one or more MBSFN data.

17. The apparatus of claim 14, further comprising configuring the preamble associated with the second burst of data to be transmitted by the second node before the joint transmission portion of the first burst of data is transmitted by the first node.

18. The apparatus of claim 14, further comprising configuring the preamble associated with the second burst of data to be transmitted by the second node after the joint transmission portion of the first burst of data is transmitted by the first node.

19. The apparatus of claim 14, further comprising configuring the preamble associated with the second burst of data to be transmitted by the second node during the joint transmission portion of the first burst of data using one or more resource elements not used by the joint transmission portion of the first burst of data.

20. The apparatus of claim 14, wherein the first node accesses the medium at a resynchronization boundary associated with a plurality of eMBMS nodes including the first node and the second node.

21. The apparatus of claim 14, wherein:
the preamble associated with the second burst of data is a first preamble, and
the first nodes transmits a second preamble prior to transmitting the first burst of data.

22. The apparatus of claim 21, wherein:
the first preamble is a unicast preamble,
the second preamble is an MBSFN preamble, and
the first node transmits a third preamble after transmitting the first burst of data, the third preamble being a unicast preamble.

23. The apparatus of claim 22, wherein the second node transmits a fourth preamble after transmitting the first burst of data, the fourth preamble being a unicast preamble.

24. The apparatus of claim 21, wherein the first and second preamble are unicast preambles, and wherein the first and second preambles are MBSFN and unicast preambles.

25. The apparatus of claim 21, further comprising a transceiver, wherein the transmit, by the second node, the second burst of data over the accessed medium.

26. The apparatus of claim 14, wherein the contention-based medium is associated with an unlicensed or shared spectrum.

27. An apparatus for wireless communications, comprising:
means for accessing, by a second node, a contention-based medium currently accessed by a first node transmitting a first burst of data to at least one user equipment (UE), the first node and second node being configured to transmit on a joint transmission portion of the contention-based medium to the at least one UE; and
means for transmitting, by the second node, a second burst of data over the contention-based medium to the at least one UE, the second burst of data having an associated preamble configured not to interfere with the joint transmission portion of the first burst of data.

28. The apparatus of claim 27, wherein:
the first node and the second node are enhanced-multimedia broadcast multicast services (eMBMS) nodes, and
the joint transmission portion of the first burst of data includes transmission of one or more multicast-broadcast single-frequency network (MBSFN) data.

29. A non-transitory computer-readable medium storing computer executable code for wireless communications, comprising: code for accessing, by a second node, a contention-based medium currently accessed by a first node transmitting a first burst of data to at least one user equipment (UE), the first node and second node being configured to transmit on a joint transmission portion of the contention-based medium to the at least one UE; and code for transmitting, by the second node, a second burst of data over the contention-based medium to the at least one UE, the second burst of data having an associated preamble configured not to interfere with the joint transmission portion of the first burst of data.

30. The non-transitory computer-readable medium of claim 29, wherein:
the first node and the second node are enhanced-multimedia broadcast multicast services (eMBMS) nodes, and
the joint transmission portion of the first burst of data includes transmission of one or more multicast-broadcast single-frequency network (MBSFN) data.

* * * * *